(12) United States Patent
Hoang et al.

(10) Patent No.: US 8,065,266 B2
(45) Date of Patent: Nov. 22, 2011

(54) RELATIONSHIP DATA MANAGEMENT

(75) Inventors: Khanh Hoang, Westminster, CA (US); Gregory Danforth, Flagstaff, AZ (US)

(73) Assignee: Informatica Corporation, Redwood City, CA (US)

(*) Notice: Subject to any disclaimer, the term of this patent is extended or adjusted under 35 U.S.C. 154(b) by 78 days.

(21) Appl. No.: 12/404,617

(22) Filed: Mar. 16, 2009

(65) Prior Publication Data

US 2009/0327347 A1 Dec. 31, 2009

Related U.S. Application Data

(63) Continuation of application No. 11/325,608, filed on Jan. 3, 2006, now Pat. No. 7,523,121.

(51) Int. Cl.
*G06F 17/00* (2006.01)

(52) U.S. Cl. ........ 707/608; 707/609; 707/791; 707/802; 707/821

(58) Field of Classification Search ........... 707/600–831
See application file for complete search history.

(56) References Cited

U.S. PATENT DOCUMENTS

| | | | |
|---|---|---|---|
| 5,600,832 | A | 2/1997 | Eisenberg et al. |
| 5,710,887 | A | 1/1998 | Chelliah et al. |
| 5,734,887 | A | 3/1998 | Kingberg et al. |
| 5,884,325 | A | 3/1999 | Bauer et al. |
| 5,956,499 | A | 9/1999 | Colgan |
| 5,970,490 | A | 10/1999 | Morgenstern |
| 6,014,647 | A | 1/2000 | Nizzari et al. |
| 6,151,608 | A | 11/2000 | Abrams |
| 6,324,541 | B1 | 11/2001 | de L'etraz et al. |
| 6,332,163 | B1 | 12/2001 | Bowman-Amuah |
| 6,345,288 | B1 | 2/2002 | Reed et al. |
| 6,477,580 | B1 | 11/2002 | Bowman-Amuah |
| 6,519,571 | B1 | 2/2003 | Guheen et al. |
| 6,523,041 | B1 | 2/2003 | Morgan et al. |
| 6,529,909 | B1 | 3/2003 | Bowman-Amuah |

(Continued)

FOREIGN PATENT DOCUMENTS

AU 2003231931 12/2003

(Continued)

OTHER PUBLICATIONS

Portions of prosecution history of U.S. Appl. No. 10/449,171, filed Mar. 10, 2010, Hoang, Khanh.

(Continued)

*Primary Examiner* — Isaac M Woo
(74) *Attorney, Agent, or Firm* — Adeli & Tollen LLP

(57) ABSTRACT

Some embodiments provide a system for processing relationship data that expresses relationship between various entities. In some embodiments, the entities are entities associated directly with an enterprise. The entities in some embodiments described below also include entities associated indirectly with the enterprise through other entities. However, one of ordinary skill will realize that some embodiments might only track relationships between entities directly associated with an enterprise. In some embodiments, the system consolidates disparate relationship data sets that relate to the same set of entities. For instance, in some embodiments, the system includes several data storages that store relationship data. For at least two entities, at least two different data storages store two different relationship data sets that differently express the relationship between the two entities. The system includes a hierarchy manager that receives the two different relationship data sets and consolidates the two different relationship data sets into one relationship data set that best expresses the relationship between the two entities.

23 Claims, 14 Drawing Sheets

U.S. PATENT DOCUMENTS

| | | | |
|---|---|---|---|
| 6,529,948 | B1 | 3/2003 | Bowman-Amuah |
| 6,542,896 | B1 | 4/2003 | Gruenwald |
| 6,604,113 | B1 | 8/2003 | Kenyon et al. |
| 6,718,386 | B1 | 4/2004 | Hanfland |
| 6,765,594 | B2 | 7/2004 | Hautt et al. |
| 6,826,568 | B2 | 11/2004 | Bernstein et al. |
| 6,839,720 | B1 | 1/2005 | Thibodeau |
| 6,947,951 | B1 | 9/2005 | Gill |
| 7,401,057 | B2 | 7/2008 | Eder |
| 7,496,588 | B2 | 2/2009 | Wong et al. |
| 7,509,326 | B2 | 3/2009 | Krabel et al. |
| 7,523,121 | B2 | 4/2009 | Hoang et al. |
| 7,822,660 | B1 | 10/2010 | Donoho et al. |
| 2001/0051946 | A1* | 12/2001 | Nishikawa ............... 707/100 |
| 2002/0004793 | A1 | 1/2002 | Keith, Jr. |
| 2002/0052551 | A1 | 5/2002 | Sinclair et al. |
| 2002/0087571 | A1 | 7/2002 | Stapel et al. |
| 2002/0094711 | A1 | 7/2002 | Hellbusch et al. |
| 2003/0065659 | A1 | 4/2003 | Agarwal et al. |
| 2003/0069780 | A1 | 4/2003 | Hailwood et al. |
| 2003/0084016 | A1 | 5/2003 | Norgaard et al. |
| 2003/0105887 | A1 | 6/2003 | Cox et al. |
| 2003/0154401 | A1 | 8/2003 | Hartman et al. |
| 2003/0167253 | A1 | 9/2003 | Meinig |
| 2003/0187716 | A1 | 10/2003 | Lee |
| 2003/0195904 | A1 | 10/2003 | Chestnut et al. |
| 2003/0197733 | A1 | 10/2003 | Beauchamp et al. |
| 2003/0212654 | A1 | 11/2003 | Harper et al. |
| 2003/0217333 | A1 | 11/2003 | Smith et al. |
| 2003/0236776 | A1 | 12/2003 | Nishimura et al. |
| 2004/0006506 | A1 | 1/2004 | Hoang |
| 2004/0073567 | A1 | 4/2004 | Pelon |
| 2004/0083199 | A1 | 4/2004 | Govindugari et al. |
| 2004/0093330 | A1 | 5/2004 | Westphal |
| 2004/0117358 | A1 | 6/2004 | Von Kaenel et al. |
| 2004/0163009 | A1 | 8/2004 | Goldstein et al. |
| 2004/0215646 | A1 | 10/2004 | Kaler et al. |
| 2004/0225629 | A1 | 11/2004 | Eder |
| 2004/0243613 | A1 | 12/2004 | Pourheidari |
| 2005/0033726 | A1 | 2/2005 | Wu et al. |
| 2005/0044009 | A1 | 2/2005 | Stone et al. |
| 2005/0066059 | A1 | 3/2005 | Zybura et al. |
| 2005/0076036 | A1 | 4/2005 | Le |
| 2005/0108024 | A1 | 5/2005 | Fawcett, Jr. et al. |
| 2005/0149539 | A1 | 7/2005 | Cameron et al. |
| 2005/0182785 | A1 | 8/2005 | Oswalt |
| 2005/0228805 | A1 | 10/2005 | Britton et al. |
| 2005/0257193 | A1 | 11/2005 | Falk et al. |
| 2005/0278270 | A1 | 12/2005 | Carr et al. |
| 2006/0031203 | A1 | 2/2006 | Rosenbaum et al. |
| 2006/0031216 | A1 | 2/2006 | Semple et al. |
| 2006/0085437 | A1 | 4/2006 | Brodhun et al. |
| 2006/0085464 | A1 | 4/2006 | Beuch et al. |
| 2006/0136428 | A1 | 6/2006 | Syeda-Mahmood |
| 2006/0167947 | A1 | 7/2006 | Dunkle |
| 2006/0179027 | A1 | 8/2006 | Bechtel et al. |
| 2006/0242184 | A1 | 10/2006 | Shur et al. |
| 2006/0253476 | A1 | 11/2006 | Roth et al. |
| 2007/0027898 | A1 | 2/2007 | Jones et al. |
| 2007/0094286 | A1 | 4/2007 | Murthy et al. |
| 2007/0156767 | A1 | 7/2007 | Hoang et al. |
| 2007/0214179 | A1 | 9/2007 | Hoang |
| 2008/0060058 | A1 | 3/2008 | Shea et al. |
| 2008/0275731 | A1 | 11/2008 | Rao et al. |
| 2009/0024589 | A1 | 1/2009 | Sood et al. |
| 2009/0182780 | A1 | 7/2009 | Wong et al. |
| 2010/0121877 | A1 | 5/2010 | Fawcett et al. |

FOREIGN PATENT DOCUMENTS

| | | |
|---|---|---|
| AU | 2009222633 | 10/2009 |
| AU | 2009222633 | 12/2010 |
| EP | 1118948 | 7/2001 |
| EP | 1509878 | 3/2005 |
| EP | 1974249 | 10/2008 |
| EP | 1974276 | 10/2008 |
| EP | 07709912 | 1/2011 |
| EP | 06840362 | 3/2011 |
| JP | 11-015903 | 1/1999 |
| JP | 11-161713 | 6/1999 |
| JP | 11-232327 | 8/1999 |
| JP | 2000-322442 | 11/2000 |
| JP | 2001-325427 | 11/2001 |
| WO | WO 01/15030 A1 | 3/2001 |
| WO | WO 02/063491 A2 | 8/2002 |
| WO | WO 03/102867 A1 | 12/2003 |
| WO | WO 2005/064491 | 7/2005 |
| WO | WO 2007/002686 A2 | 1/2007 |
| WO | WO 2007/079467 A2 | 7/2007 |
| WO | WO 2007/081666 A2 | 7/2007 |

OTHER PUBLICATIONS

Portions of prosecution history of U.S. Appl. No. 11/169,319, filed Dec. 8, 2008, Wong, Stanley, et al.

Portions of prosecution history of U.S. Appl. No. 11/325,612, filed Mar. 16, 2010, Hoang, Khanh, et al.

Office Action of U.S. Appl. No. 11/617,684, filed Mar. 31, 2010, Hoang, Khanh.

Portions of prosecution history of U.S. Appl. No. 11/325,608, filed Mar. 3, 2009, Hoang, Khanh, et al.

Portions of prosecution history of U.S. Appl. No. 11/957,398, filed May 24, 2010, Sood, Manish, et al.

International Search Report for PCT/US2003/017125, Sep. 11, 2003 (mailing date), Siperian, Inc.

International Search Report and Written Opinion for PCT/US2006/025017, Jul. 31, 2007 (mailing date), Siperian, Inc.

International Preliminary Report on Patentability PCT/US2006/025017, Jan. 17, 2008 (mailing date), Siperian, Inc.

International Search Report and Written Opinion for PCT/US2006/062721, Feb. 14, 2008 (mailing date), Siperian, Inc.

International Preliminary Report on Patentability for PCT/US2006/062721, Jul. 17, 2008 (mailing date), Siperian, Inc.

International Search Report and Written Opinion for PCT/US2007/060021, Feb. 15, 2008 (mailing date), Siperian, Inc.

International Preliminary Report on Patentability for PCT/US2007/060021, Jul. 17, 2008 (mailing date), Siperian, Inc.

EP Office Communication of 03756308.7, Jan. 21, 2010 (mailing date), Siperian, Inc.

Supplemental EP Search Report of 06840362.5, Oct. 28, 2009 (mailing date), Siperian, Inc.

EP Office Communication of 06840362.5, Nov. 10, 2009 (mailing date), Siperian, Inc.

Supplemental European Search Report of 07709912.5, Oct. 28, 2009 (mailing date), Siperian, Inc.

EP Office Communication of 07709912.5, Nov. 10, 2009 (mailing date), Siperian, Inc.

Chieu, Trieu, et al., "Unified Solution for Procurement Integration and B2B Stores," ACM, Sep. 2003, pp. 61-67, ACM, Pittsburg, PA.

Ghemawat, Sunjay, et al., "The Google File System," Oct. 2003, pp. 29-43 ACM, Bolton Landing, NY.

Angles, Renzo, et al., Querying RDF Data from a Graph Database Perspective, The Semantic Web: Research and Applications, May 19, 2005, pp. 346-360, vol. 3532, Springer-Verlag, Berlin/Heidelberg.

Bernstein, Philip A., et al., Principles of Transaction Processing for the Systems Professional, 1997 (Month NA), pp. 241-266 and 311-324, Morgan Kauffman Publishers, Inc., San Francisco, CA.

Elfeky, Mohamed G., et al., TAILOR: A Record Linkage Toolbox, Proceedings 18TH. International Conference on Data Engineering, Feb. 26, 2002, pp. 17-28.

Eklund, Peter, et al., OntoRama: Browsing RDF Ontologies using a Hyperbolic-style Browser, Nov. 6, 2002.

Fung, Chun Che, et al., "Intelligent Meters for Improved System Operation and Customer Relationship Management," International Conference on Power System Technology, May 2002, vol. 3, pp. 1758-1762.

Goodman, Nathan, Bill of Materials in Relational Database, Mar. 21, 1990, pp. 2-12, Iowa City, IA, vol. 5, No. 1.

Graves, Mark, et al., Graph Database Systems, IEEE Engineering in Medicine and Biology Magazine, Nov. 1, 1995, pp. 737-745, vol. 14, No. 6.

Kiesel, Norbert, et al., GRAS, a Graph-Oriented Database System for (Software) Engineering Applications, Proceeding of the Sixth International Workshop on Singapore Jul. 19-23, 1993, pp. 272-286, Los Alamitos, CA.

Ponniah, Paulraj, Data Warehousing Fundamentals: A Comprehensive Guide for IT Professionals, 2001 (Month NA), John Wiley & Sons, Inc., New York, NY.

Rahm, Erhard, et al., Data Cleaning: Problems and Current Approaches, Quarterly Bulletin of the Computer Society of the IEEE Technical Committee on Data Engineering, Dec. 1, 2000, pp. 1-11, Washington, D.C.

Yan, Lian, et al., "Improving Prediction of Customer Behavior in Nonstationary Environments," International Joint Conference on Neural Networks, Jul. 2001, vol. 3, pp. 2258-2263.

Updated portions of prosecution history of U.S. Appl. No. 10/449,171, filed Oct. 12, 2010, Hoang, Khanh.

Updated portions of prosecution history of U.S. Appl. No. 11/325,612, filed Aug. 18, 2010, Hoang, Khanh, et al.

Updated portions of prosecution history of U.S. Appl. No. 11/617,684, filed Oct. 14, 2010, Hoang, Khanh.

Updated portions of prosecution history of U.S. Appl. No. 11/957,398, filed Aug. 19, 2010, Sood, Manish, et al.

Updated portions of prosecution history of EP03756308.7, Jul. 30, 2010, Siperian, Inc.

Updated portions of prosecution history of EP06840362.5, Sep. 6, 2010, Siperian, Inc.

Updated portions of prosecution history of EP07709912.5, May 19, 2010, Siperian, Inc.

Updated portions of prosecution history of U.S. Appl. No. 10/449,171, Mar. 3, 2011, Hoang, Khanh.

Updated portions of prosecution history of U.S. Appl. No. 11/169,319, Jan. 22, 2009, Wong, Stanley, et al.

Portions of prosecution history of U.S. Appl. No. 12/353,062, May 10, 2011, Wong, Stanley, et al.

Updated portions of prosecution history of U.S. Appl. No. 11/325,612, Apr. 26, 2011, Hoang, Khanh, et al.

Updated portions of prosecution history of U.S. Appl. No. 11/617,684, Apr. 14, 2011, Hoang, Khanh.

Updated portions of prosecution history of U.S. Appl. No. 11/325,608, Mar. 9, 2009, Hoang, Khanh et al.

Updated portions of prosecution history of U.S. Appl. No. 11/957,398, May 3, 2011, Sood, Manish et al.

Walton, Cheryl, "Managing Multiple Databases," http://support.novell.com/techcenter/articles/nc1999_10b.html,Oct. 1, 1999, Novell.

* cited by examiner

RELATIONSHIP DATA MANAGEMENT

CLAIM OF BENEFIT TO PRIOR APPLICATION

This application is a continuation application of U.S. patent application Ser. No. 11/325,608, filed Jan. 3, 2006, now issued as U.S. Pat. No. 7,523,121. U.S. Pat. No. 7,523,121 is incorporated herein by reference.

FIELD OF THE INVENTION

The present invention relates to the field of data management, and in particular, to relationship data management.

BACKGROUND OF THE INVENTION

One of the key assets an enterprise has is the data it captures about its customers and their interactions with these customers. Data regarding a particular customer and his/her interactions/relationships are typically created by various enterprises using software applications that provide a solution for a single business function, product line or touch point, the data being stored in a plurality of disparate and independent data sources. This results in applications and data sources that are managed independently and do not share data well with one another. Also, the applications and data sources often have different data models and means of tracking and reporting customer interactions, leaving enterprises with islands of difficult-to-reconcile relationship data. As such, data regarding a customer is strewn across multiple applications and data sources in different lines of business or product divisions. Due to this data dispersion, it is difficult for an enterprise to obtain a comprehensive view of a customer and his/her interactions with the various enterprises.

The lack of a comprehensive view of customers drives a variety of business problems. Marketing, sales, finance, call-center, and service agents lack a complete understanding or overview of the customer's interactions to other enterprises. As such, opportunities to drive new revenues or increase profitability are lost, for example, when new potential customers or opportunities are not linked and identified. Opportunities are also lost when cross-sell and up-sell recommendations are based on generic offers or inaccurate or incomplete data about an individual customer. Operational, compliance, and credit risk increases as organizations lack a comprehensive understanding of customer relationships.

Conventionally, enterprises have been unable to properly leverage available customer data stored in multiple data source locations and can only obtain a fragmented view of a customer and the customer's relationships with various enterprises. As such, there is a need for a method for leveraging all of the available customer data to create and maintain a unified and comprehensive view of a customer across multiple disparate data sources. More generally, there is a need in the art for a better way of capturing, maintaining, and viewing relationship data that expresses relationship between various entities associated with an enterprise.

SUMMARY OF THE INVENTION

Some embodiments provide a system for processing relationship data that expresses relationship between various entities. In some embodiments, the entities are entities associated directly with an enterprise. The entities in some embodiments described below also include entities associated indirectly with the enterprise through other entities. However, one of ordinary skill will realize that some embodiments might only track relationships between entities directly associated with an enterprise.

In some embodiments, the system consolidates disparate relationship data sets that relate to the same set of entities. For instance, in some embodiments, the system includes several data storages that store relationship data. For at least two entities, at least two different data storages store two different relationship data sets that differently express the relationship between the two entities. The system includes a hierarchy manager that receives the two different relationship data sets and consolidates the two different relationship data sets into one relationship data set that best expresses the relationship between the two entities.

In some embodiments, the system includes various different applications that differently express relationship data between entities. In some of these embodiments, the system includes a hierarchy manager that captures relationship data sets from the various applications. Each captured relationship data set expresses a relationship between a set of entities (e.g., two entities). When captured, the relationship data sets express the relationships in an application-centric manner (i.e., in a manner that is particular to the application that stores the relationship data). The hierarchy manager then converts the captured relationship data sets into an enterprise, normalized format that has been defined for uniformly specifying relationship data for the enterprise that uses the system.

In this conversion process, the hierarchy manager in some embodiments performs cleansing, standardization, and mapping operations on the data. After the conversion process, the hierarchy manager of some embodiments consolidates duplicate and potentially differing copies of relationship data sets that express a relationship between a set of entities (e.g., between two entities). The hierarchy manager performs this consolidation so that the enterprise normalized relationship data sets express the best version of the relationship between different sets of entities.

In some embodiments, the hierarchy manager performs an update operation on a previously stored relationship data set, when it receives a new relationship data set relating to the same relationship as the previously stored relationship data set. This update operation might not modify the previously stored relationship data set in any manner, or it might modify all or some part of this data set.

The hierarchy manager of these embodiments can also be configured to perform merge operations on the enterprise, normalized relationship data sets periodically or at any random point in time. Such merge operations are performed in some embodiments based on a set of merge rules that can be modified at any time.

To perform update and merge operations, the hierarchy manager of some embodiments store content metadata for each particular consolidated relationship data set. In some embodiments, content metadata includes lineage data that includes each preceding value that was contained in a relationship data set maintained by the hierarchy manager. The content metadata can also include history, which, in some embodiments, includes factors that at some point might affect the value of a relationship data set that is maintained by the hierarchy manager.

In some embodiments, the system does not consolidate disparate relationship data sets that relate to the same set of entities. Instead, the system only collects relationship data sets that specify relationship between different entities associated directly or indirectly with the enterprise.

Irrespective of whether the system consolidates disparate relationship data sets that relate to the same set of entities, or simply collects them, the system in some embodiments provides a comprehensive "360° view" of the relationships between an entity and other entities associated directly or indirectly with the enterprise. In some embodiments, the system can provide such comprehensive views since it maintains "master reference data" for each entity associated directly or indirectly with the enterprise. "Reference data" is data that identifies an entity, whereas, as mentioned above, relationship data is data that identifies the relationship between the entities. Reference and relationship data are non-transaction data. "Activity data", on the other hand, is data that is associated with transactions or interactions of an entity.

In some cases, the system includes multiple data storages that can store multiple reference data records for a particular entity. This redundant data may cause problems for an enterprise that uses the data. For instance, the redundant data may contain inconsistencies or overlaps that need to be resolved to ensure the reliability of the data. Therefore, the system stores a "best version" of the reference data for at least some of the entities. The "best version" of the reference data for an entity is referred to below as the master reference data for the entity.

As mentioned above, the ability of the system to store master reference data for a particular entity allows the system to provide complete 360°-views of the relationships of the particular entity and other entities directly and/or indirectly associated with an enterprise. In turn, the systems ability to provide complete 360°-views of the relationships enables the system to provide "cross-hierarchy navigation". Cross-hierarchy navigation is the ability of a user or an application that uses the system to explore relationships that are not directly defined as an explicitly specified relationship (e.g., that are not defined along any relationship that is natively specified by the system or an application from which the system imports data).

Cross-hierarchy navigation allows a user or an application that uses the system to identify indirect relationships between entities that do not have a direct relationship. For instance, through cross-hierarchy navigation, the system might identify an indirect relationship between two particular entities that are not directly related to each other, but are directly related to a third entity along two different relationship hierarchies. When different relationship hierarchies are imported from different applications, cross-hierarchy navigation allows a user or application to identify relationships of entities that are in different hierarchies.

In some embodiments, the system records one or more temporal attributes for some or all of the relationships that it tracks. Examples of such temporal attributes include start and/or end dates for a relationship. Recording such temporal attributes allows the system to keep track of the changing relationship between two entities. For instance, in keeping track of the job titles of the employees of a company, the system of some embodiments can keep track of start and end dates of each position that an employee holds within the company. In this manner, the system can track the employee as his or her relationship changes with the company.

In some embodiments where the system records one or more temporal attributes of some or all relationships that it tracks, the system allows a user or an application to run queries based on temporal criteria. For instance, the system of some embodiments would allow a user to run a query to identify all employees of a company who started after a particular date or who were promoted within a particular time from the start of their employment.

BRIEF DESCRIPTION OF THE DRAWINGS

The novel features of the invention are set forth in the appended claims. However, for purpose of explanation, several embodiments of the invention are set forth in the following figures.

FIGS. 5-9 present several examples that illustrate the concepts of enterprise, normalized hierarchical data and cross-hierarchy navigation.

DETAILED DESCRIPTION OF THE INVENTION

In the following description, numerous details are set forth for purpose of explanation. However, one of ordinary skill in the art will realize that the present invention may be practiced without use of these specific details. In other instances, well-known structures and devices are shown in block diagram form in order not to obscure description of the invention with unnecessary detail.

Some embodiments provide a system for processing relationship data that expresses relationship between various entities. In some embodiments, the entities are entities associated directly with an enterprise. The entities in some embodiments described below also include entities associated indirectly with the enterprise through other entities. However, one of ordinary skill will realize that some embodiments might only track relationships between entities directly associated with an enterprise.

In some embodiments, a relationship data set expresses one or more dimensions of a relationship that exists between two entities associated directly or indirectly with an enterprise. For instance, a relationship data set captures the relationship between two customers of an enterprise, a customer and the enterprise, two employees of an enterprise, etc. In some embodiments, each dimension of a particular relationship is expressed as an attribute of the relationship data set that represents the particular relationship.

I. OVERVIEW

Figure 1:
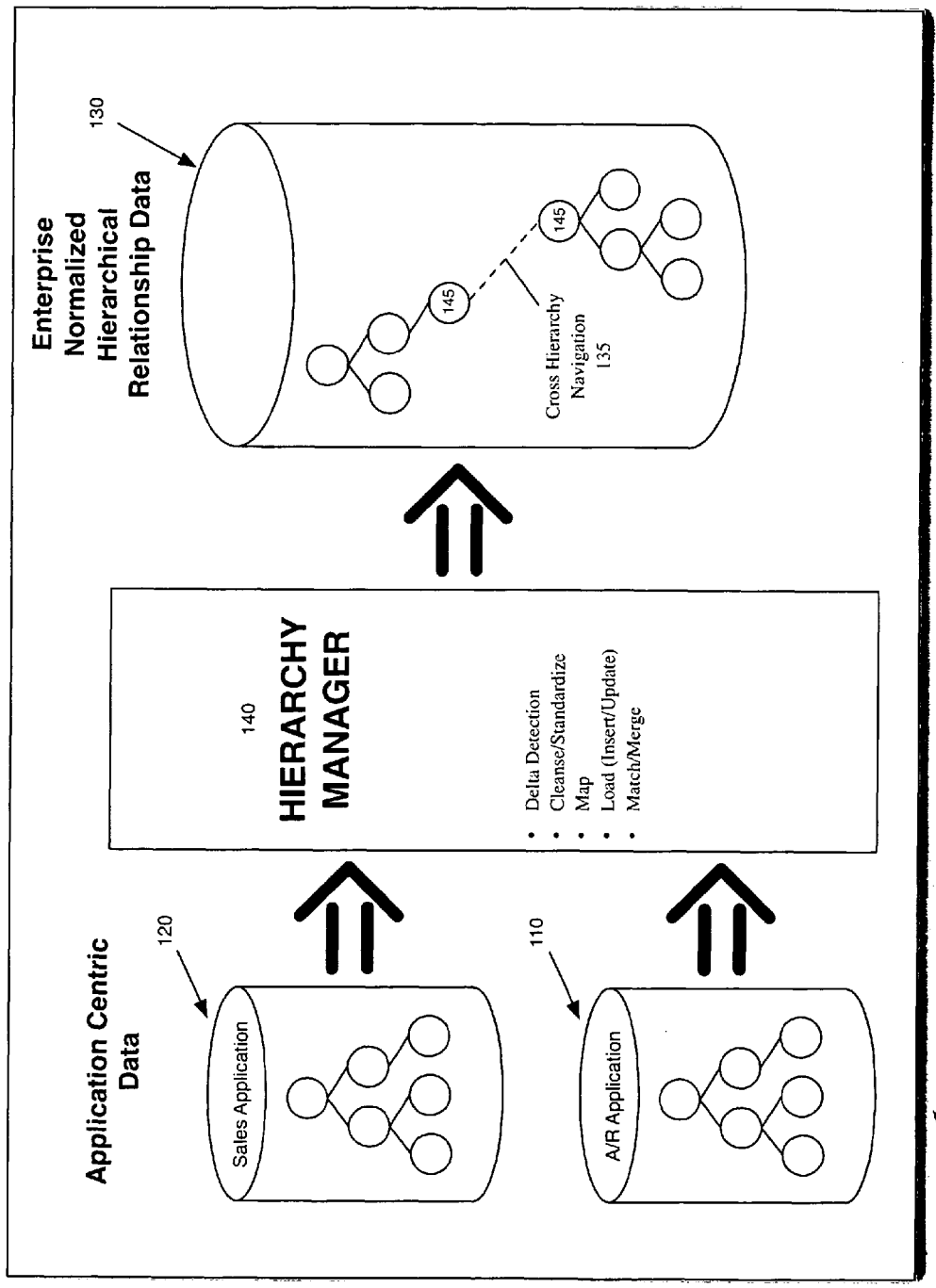
FIG. 1 illustrates a system of some embodiments of the invention.

FIG. 1 illustrates the system 100 of some embodiments of the invention. An enterprise uses this system to maintain records regarding relationships amongst various entities (e.g., customers, vendors, products, employees, etc.) associated directly or indirectly with the enterprise. In some embodiments, this system collects and/or integrates various entities' relationship data that exist in disparate locations within the system into a central, enterprise-normalized relationship data store.

As shown in this figure, the system 100 includes (1) one or more applications 110 and 120, (2) a hierarchy manager 140, and (3) an enterprise-normalized relationship data store. The applications 110 and 120 typically store relationship data in an application-centric manner, i.e., in a manner that is particular to the application that stores the relationship data. For example, an organization's sales application data 120 stores relationships about customers in a manner that is specific to how the sales application 120 stores sales activity. Similarly, the organization's accounts receivable (A/R) application data 110 stores customer relationships in a manner that is specific to how the A/R application stores receivable data.

The hierarchy manager 140 receives the relationship data sets from the various applications 110 and 120. On the received relationship data sets, the hierarchy manager 140 performs a variety of operations, such as delta detection, cleansing, standardization, mapping, loading, and matching/merging. It can perform any of these operations in real time or in batch.

When received by the hierarchy manager 140, a relationship data sets might express the relationships in an application-centric manner (i.e., in a manner that is particular to the application that stores the relationship data). The hierarchy manager 140 then converts the captured relationship data sets into an enterprise, normalized format that is stored in the enterprise, normalized data store 130. The enterprise, normalized format uniformly specifies relationship data for the enterprise.

In this conversion process, the hierarchy manager in some embodiments performs cleansing, standardization, and mapping operations on the data. Cleansing operations of some embodiments clean up and correct the data in an incoming relationship data set. For instance, to perform date cleansing, the hierarchy manager remove extraneous blanks or other noise characters, change case for an attribute, etc.

In some embodiments, standardization is the process of homogenizing different data codifications. For example, in one application-centric body of data, the male gender may be codified as 'M'. In another application-centric body of data, the male gender may be codified as '1'. During standardization, the system assimilates these two different coding styles into a uniform coding style for the hierarchy manager's data store. In this example, it may be that hierarchy manager standardizes on male codification as 'M', '1', '456', or some other value. Standardization allows for deterministic conversion of incoming data codification into the uniform codification used by hierarchy manager.

In some embodiments, mapping is the process of projecting incoming data from a source application-centric schema onto an enterprise, normalized target schema. Application-centric data stores have schema, also known as data model, which is most conducive to the specific application which they service. The hierarchy manager stores data in a schema that similarly is most suitable for its purpose of managing hierarchical relationship data. Schema mapping determines the appropriate location in the target schema for each incoming data record.

After the conversion process, the hierarchy manager 140 of some embodiments loads the received relationship data set in a data storage. In some embodiments, this loading operation involves checking whether the relationship data set was previously stored by the hierarchy manager. To perform this check, the hierarchy manager checks the data storage to determine whether a relationship data set exists with the same key as the received relationship data set.

When the hierarchy manager determines that the received relationship data set was not previously stored, it stores (i.e., "inserts") the received relationship data set in the data storage. On the other hand, when the relationship data set was previously stored, the hierarchy manager in some embodiments performs an update operation. The update operation consolidates duplicate, and at times differing, copies of relationship data sets that express a relationship between a set of entities (e.g., between two entities). An update operation might not modify the previously stored relationship data set in any manner, or it might modify all or some part of this data set. The hierarchy manager in some embodiments performs such a consolidation so that the enterprise normalized relationship data sets express the best version of the relationship between different sets of entities.

In some embodiments, the hierarchy manager uses match/merge operations instead of or in conjunction with the update operation, in order to the try to consolidate duplicate relationship data sets. In some embodiments, the hierarchy manager performs match/merge operations based on a set of merge rules that can be modified at any time. The set of merge rules specify when two relationship data sets relate to the relationship even though they are stored in data storage as two different relationship data sets.

To perform update and merge operations, the hierarchy manager of some embodiments stores relationship metadata for each particular consolidate relationship data set that expresses a particular relationship between a particular set of entities. Two examples of relationship metadata are history and lineage.

In some embodiments, the history of a particular relationship data set that represents a particular relationship includes all the factors that could affect each attribute of the particular relationship data set at any time. For instance, in some embodiments, the history for a particular relationship data set includes every particular value ever received for each particular attribute of the particular relationship data set, and the source of the particular value, irrespective of whether the hierarchy manager ever assigned the particular value to the particular attribute in the particular relationship data set.

On the other hand, some embodiments define the lineage of a particular relationship data set (which represents a particular relationship) to include only the particular values that at some point were assigned by the hierarchy manager to a particular attribute of the particular relationship data set.

In some embodiments, the system does not consolidate disparate relationship data sets that relate to the same set of entities. Instead, the system only collects relationship data sets that specify relationship between different entities associated with an enterprise.

Irrespective of whether the system consolidates disparate relationship data sets that relate to the same set of entities, or simply collects them, the system in some embodiments provides a comprehensive "360° view" of the relationships between an entity and other entities associated with an enterprise. In some embodiments, the system can provide such comprehensive views since it maintains "master reference data" for each entity associated with the enterprise. "Reference data" is data that identifies an entity, whereas, as mentioned above, relationship data is data that identifies the relationship between the entities. Reference and relationship data are non-transaction data. "Activity data", on the other hand, is data that is associated with transactions or interactions of an entity.

In some cases, the system includes multiple data storages that can store multiple reference data records for a particular entity. This redundant data may cause problems for an enterprise that uses the data. For instance, the redundant data may contain inconsistencies or overlaps that need to be resolved to ensure the reliability of the data. Therefore, the system stores a "best version" of the reference data for at least some of the entities. The "best version" of the reference data for an entity is referred to below as the master reference data for the entity.

As mentioned above, the ability of the system to store master reference data for a particular entity allows the system to provide complete 360°-views of the relationships of the particular entity and other entities associated with an enterprise. In turn, the systems ability to provide complete 360°-views of the relationships enables the system to provide "cross-hierarchy navigation".

Cross-hierarchy navigation is the ability of a user or an application that uses the system to explore relationships are not directly defined as a particularly specified relationship (e.g., that are not defined along any relationship that is natively specified by the system or an application from which the system imports data).

Cross-hierarchy navigation allows a user or an application that uses the system to identify indirect relationships between entities that do not have a direct relationship. For instance, through cross-hierarchy navigation, the system might identify an indirect relationship between two particular entities that are not directly related to each other, but are directly related to a third entity along two different relationship hierarchies. When different relationship hierarchies are imported from different applications, cross-hierarchy navigation allows a user or application to identify relationships of entities that are in different hierarchies.

Figure 2:
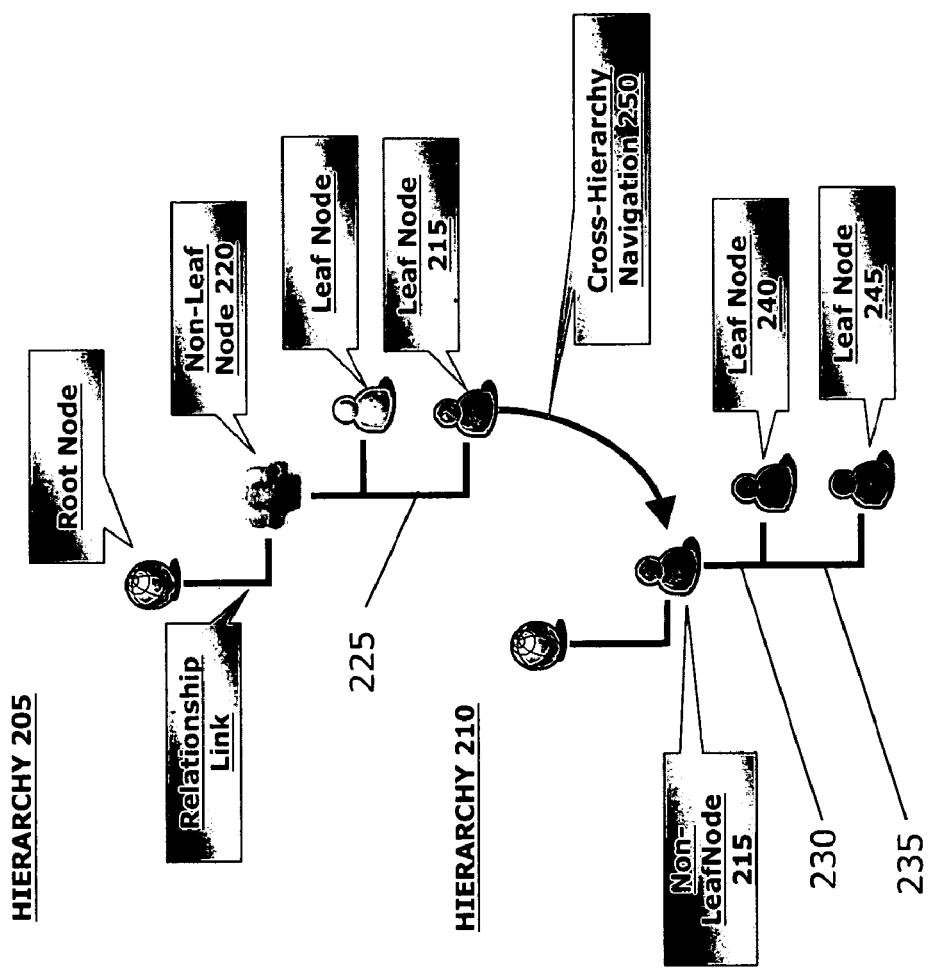
FIG. 2 illustrates an example of cross-hierarchy navigation.

FIG. 1 illustrates an example of a cross-hierarchy navigation 135 between two hierarchical data structures that specify three relationship of an entity 145 along two different relationship hierarchies. FIG. 2 illustrates another example of cross-hierarchy navigation. Specifically, this figure illustrates two hierarchical data structures 205 and 210. Each of these data structures as a root node, one non-leaf, non-root node, and two leaf nodes. In this example, each node represents an entity associated with an enterprise. One node 215 appears as a leaf node in the data structure 205 and as a non-leaf node in the data structure 210. In each structure, the links between each pair of nodes defines a direct relationship between the two entities represented by the nodes.

The first hierarchical data structure 205 expresses one relationship 225 between the entity 215 and an entity 220 along a first relationship dimension, while the second hierarchical data structure 210 expresses two relationships 230 and 235 between the entity 215 and two entities 240 and 245. Through the cross-hierarchy navigation 250, a user or an application that uses the system can identify an indirect relationship between the entities 220 and the entities 240 and 245.

II. SYSTEM

Figure 3:
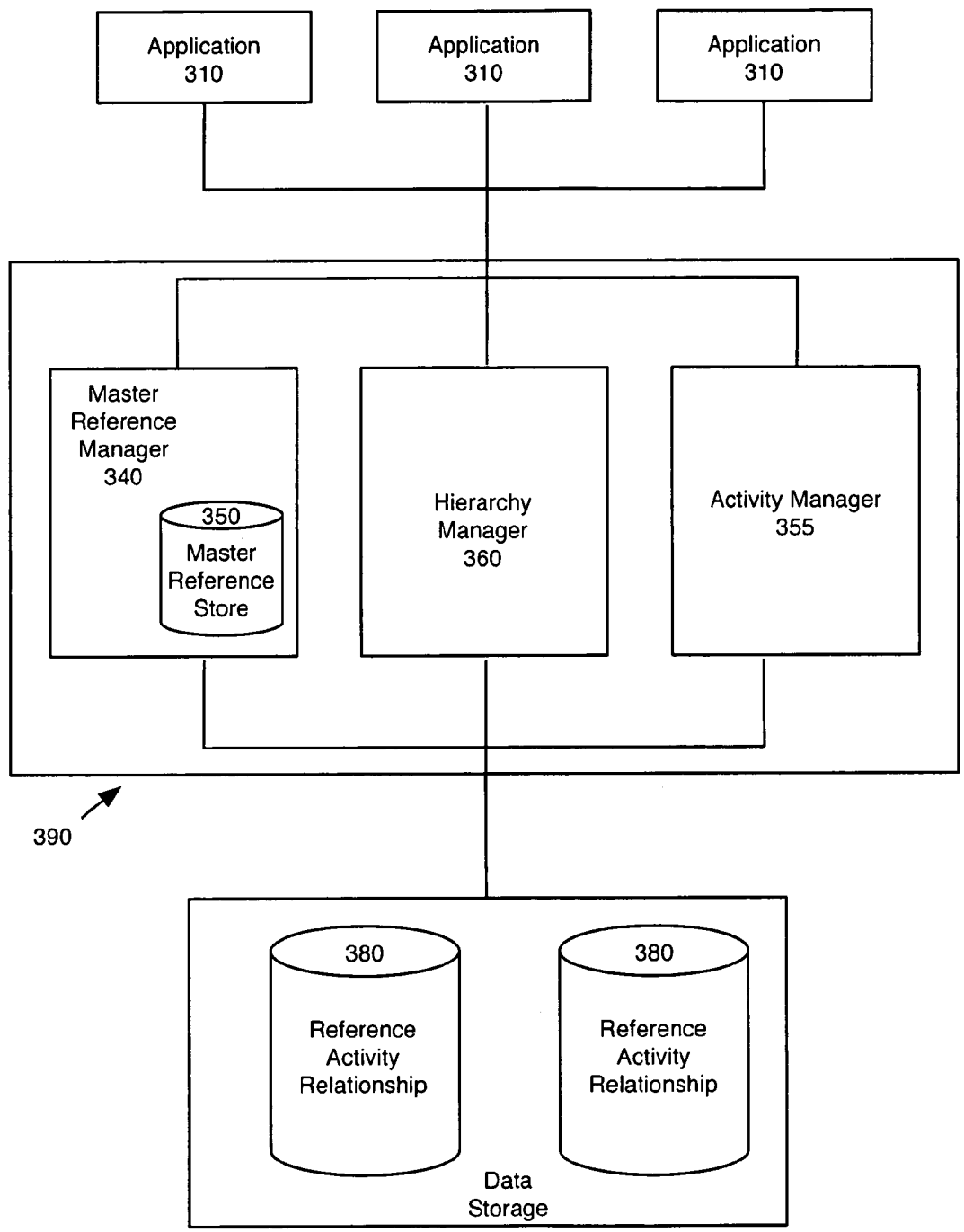
FIG. 3 illustrates a more detailed view of a system that implements some embodiments of the invention.

FIG. 3 illustrates a more detailed view of a system 300 that implements some embodiments of the invention. An enterprise uses this system to maintain records regarding relationships amongst various entities (e.g., customers, vendors, products, employees, etc.) associated with the entity. As shown in this figure, the system 300 includes a master reference manager 340, an activity manager 355, and a hierarchy manager 360 that run on one or more servers 390. The system further includes one or more applications 310, and one or more data storages 380.

The data storages 380 store (1) data that identifies the entities that the system tracks for the enterprise, (2) data that specifies the interaction of these entities with the enterprise, and (3) data that identifies the relationship between the entities. As mentioned above, the data that identifies the entities is referred to as reference data, the data that specifies the interactions and transactions with the entities is referred to as activity data, and the data that identifies the relationship between the entities is referred to as relationship data.

The data storages 380 might store multiple reference data records for a particular entity. This redundant data may cause problems for an enterprise that uses the data. For instance, the redundant data may contain inconsistencies or overlaps that need to be resolved to ensure the reliability of the data. Therefore, the system 300 also stores a "best version" of the reference data record for at least some of the entities. Specifically, the master reference manager 340 stores and maintains these best versions in a master reference store 350. For instance, the master reference manager 340 updates the reference data records in the master reference store 350 to reflect any changes to the reference data records in the data storages 380. The operation of the master reference manager is further described in U.S. patent application Ser. No. 11/169,319, now issued as U.S. Pat. No. 7,496,588. This application is incorporated herein by reference.

The activity manager 355 uses the reference data records whenever an application initiates a particular interaction with the enterprise regarding a particular entity. In such a situation, the activity manager 355 is responsible for providing a composite data object to the particular application, in order to allow the particular application to use activity data regarding the particular interaction. A composite data object includes in some embodiments reference data and activity data. The reference data is provided to the activity manager 355 from the master reference manager 340. This reference data is an instance of all or part of the master reference record stored in the master reference store 350 for the particular entity.

The activity data of the composite object, on the other hand, is data that the activity manager 355 manages. The particular application then uses transaction data regarding the particular interaction in the activity data of the composite data object that it receives from the activity manager 355. After using the transaction data, the application then might temporarily or permanently store the composite data object, or data extracted from this object, in one or more of the data storages 380. The application might temporarily or permanently store this composite data object, or data extracted from this object, directly into the data storage, or indirectly through another module or application (e.g., indirectly through the activity manager 355).

The data storages 380 might store multiple relationship data records for a particular entity. This redundant data may cause problems for an enterprise that uses the data. For instance, the redundant data may contain inconsistencies or overlaps that need to be resolved to ensure the reliability of the data. Therefore, the system 300 in some embodiments stores a "best version" of the relationship data record for at least some of the entities. Specifically, the hierarchy manager 360 of some embodiments stores and maintains these best versions in the master reference store 350. For instance, the hierarchy manager 360 updates the relationship data records in the master reference store 350 to reflect any changes to the relationship data records in the data storages 380.

Figure 4:
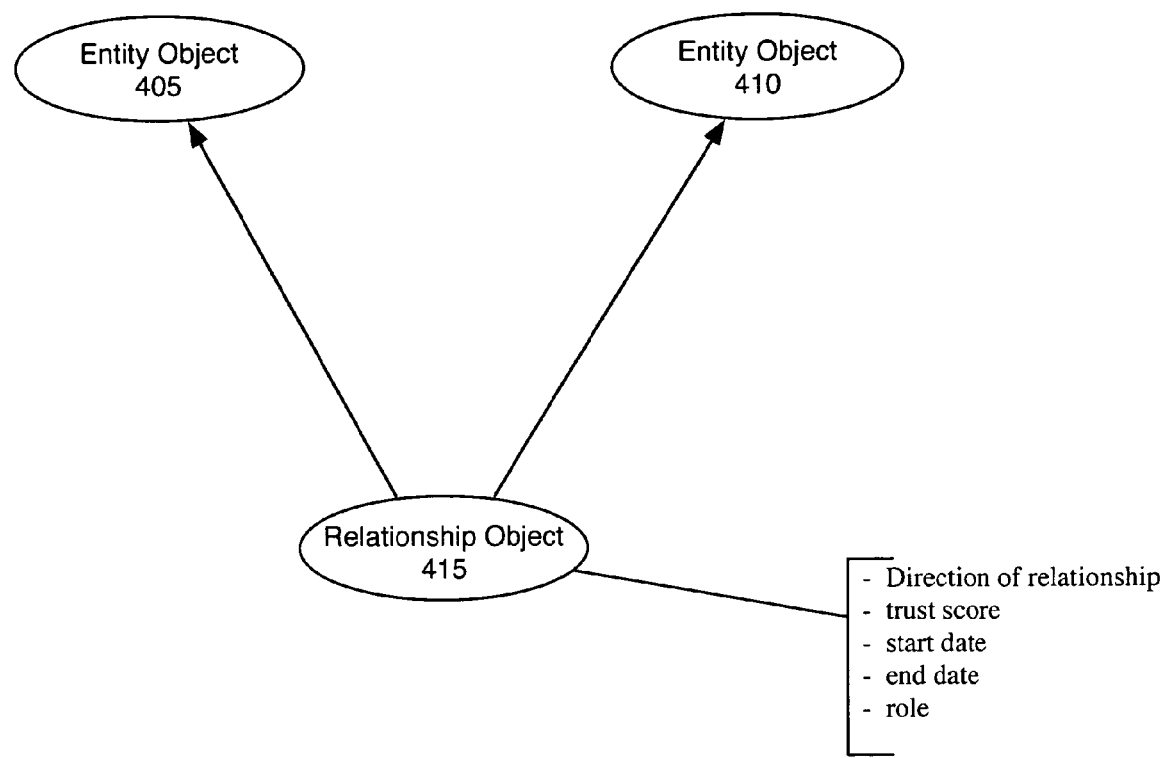
FIG. 4 illustrates a relationship data object of some embodiments of the invention.

For some embodiments of the invention, FIG. 4 illustrates the data structure of a relationship object 415 between two reference objects 405 and 410 of two entities. As shown in this figure, the relationship object 415 stores various attributes of the relationship that it represents. In some embodiments, the various attributes include direction of relationship, start date, end date, trust score, role, or other attributes.

Direction of the relationship represents which entity is pointing to the other, for example, if the entities are in a parent-child relationship then the direction is from child to parent in some embodiments. Peer objects are those who have the same parent. Therefore, if two child entities point to the same parent entity, it means that they have a sibling relationship, which may not be explicitly marked in some embodiments.

The start and end dates of each relationship allows the system to keep track of the changing relationship between two entities. For instance, in keeping track of the job titles of the employees of a company, the hierarchy manager of some embodiments can keep track of start and end dates of each position that an employee holds within the company. In this manner, the hierarchy manager can track the employee as his or her relationship changes with the company. In some embodiments where the hierarchy manager records one or more temporal attributes of some or all relationships that it tracks, the hierarchy manager allows a user or an application to run queries based on temporal criteria. For instance, the system of some embodiments would allow a user to run a query to identify all employees of a company who started after a particular date or who were promoted within a particular time from the start of their employment.

The role attribute can be used to specify the role of an entity within an enterprise or within an organization or household associated with an enterprise. An example of a role attribute might be the specialty of a professional or the position of an individual in a household. The attributes mentioned above are but a few example of attributes that some embodiments can define. Other embodiment might allow a relationship object to store other types of attributes that define a relationship. Also, in some embodiments, the attributes are user extensible.

The hierarchy manager in some embodiments does not consolidate disparate relationship data sets that relate to the same set of entities. Instead, it only collects relationship data sets that specify relationship between different entities associated with an enterprise. Irrespective of whether the hierarchy manager consolidates disparate relationship data sets that relate to the same set of entities, or simply collects them, the manager 360 in some embodiments provides a comprehensive "360°view" of the relationships between an entity and other entities associated with an enterprise, as described above. Also, as discussed above, such 360°-views allow the system to provide cross-hierarchy navigation.

III. EXAMPLES

Figure 5:
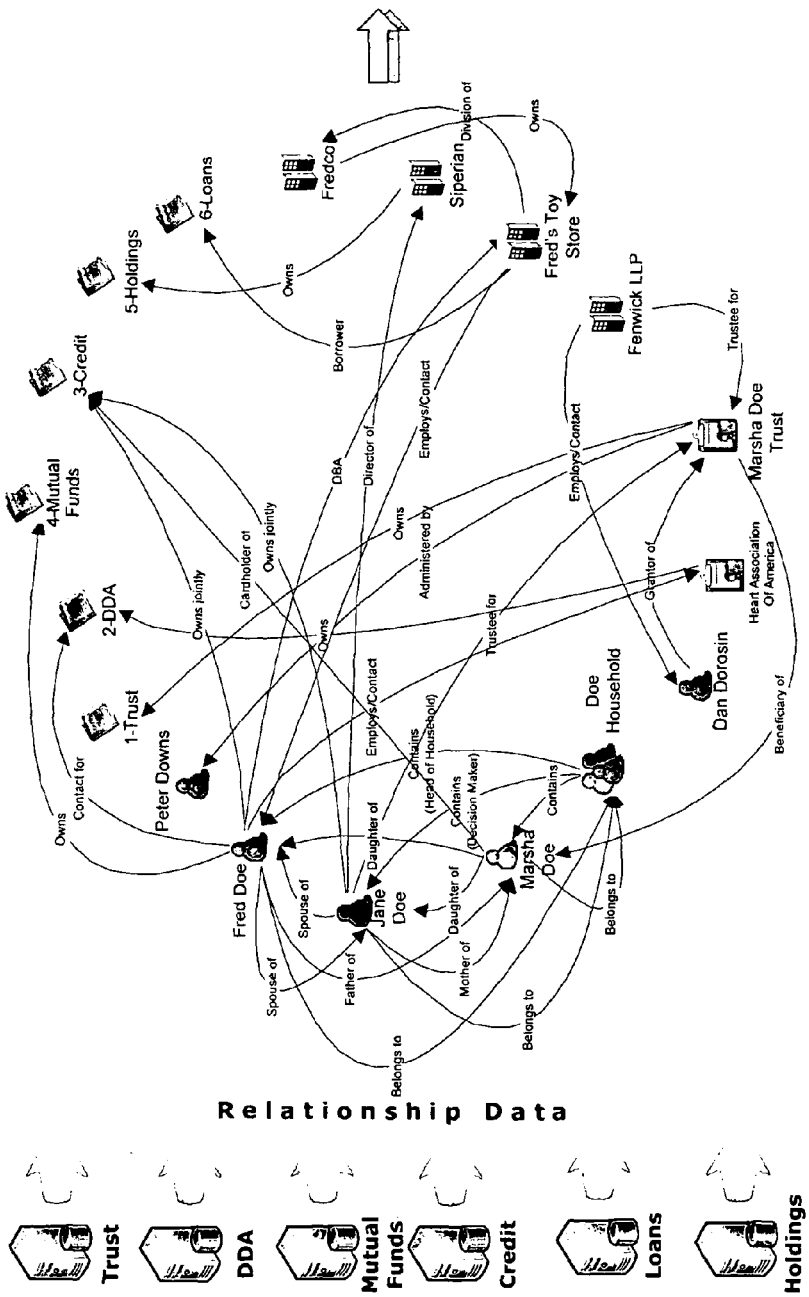

FIGS. 5-9 present several examples that illustrate further the concepts of enterprise, normalized hierarchical data and cross-hierarchy navigation. Specifically, FIG. 5 illustrates entity data of an enterprise. As shown in this figure, there are a myriad of hierarchical (i.e., relationship) data between various entities associated with the enterprise. This relationship data is from the data stores of multiple different applications 505 of the enterprise. Each of these applications typically stores the relationship data in an application-centric manner that is particular to the application.

Figure 6:
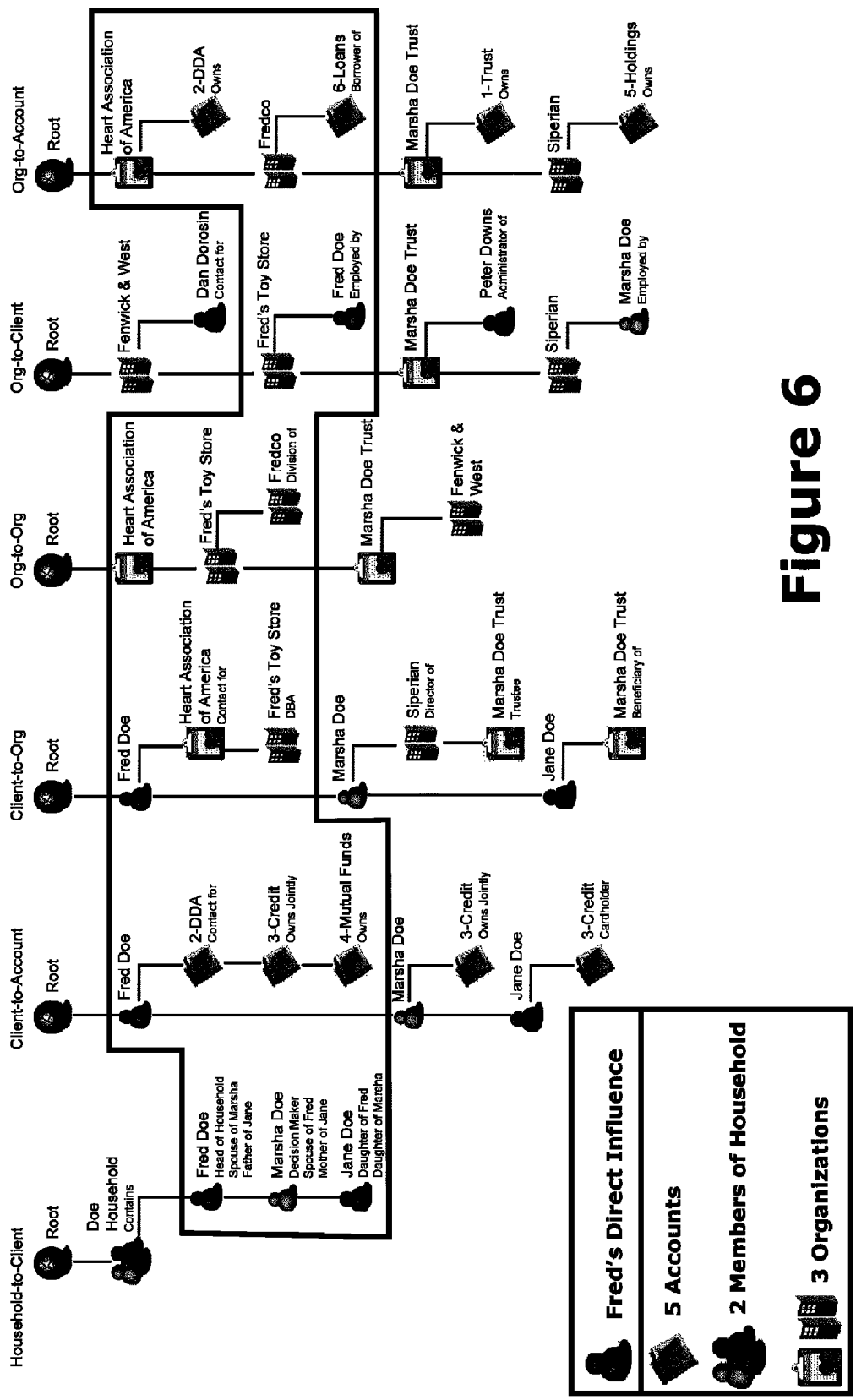

FIG. 6 illustrates the relationship data of the enterprise after this data as been processed by the hierarchy manager 360 of some embodiments of the invention. This figure shows that the hierarchy manager's processing of the relationship data has resulted in a manageable set of data structures. These data structures are defined in an enterprise, normalized manner. Moreover, the hierarchy manager 360 allows a user or an application to analyze these data structures concurrently to obtain a complete 360°-view of the relationships of an entity. For instance, FIG. 6 illustrates the hierarchy manager can uniquely identify Fred Doe or entities related to Fred Doe across the various different data structures. Accordingly, the hierarchy manager can generate a summary of Fred's direct influence within the enterprise. In this example, Fred's direct influence can be summarized as: Fred is an entity with five accounts, has two other members in his household, and is a member of three organizations.

The hierarchy manager's ability to uniquely identify Fred in the various data structures, and its ability to associate relationships between Fred and other entities in different data structures, enables the hierarchy manager's cross-hierarchy navigation. Such navigation, in turn, can be used to obtain the complete 360'-view of Fred's relationships. It also allows the identification of indirect relationships between entities that might not have a direct relationship.

Figure 7:
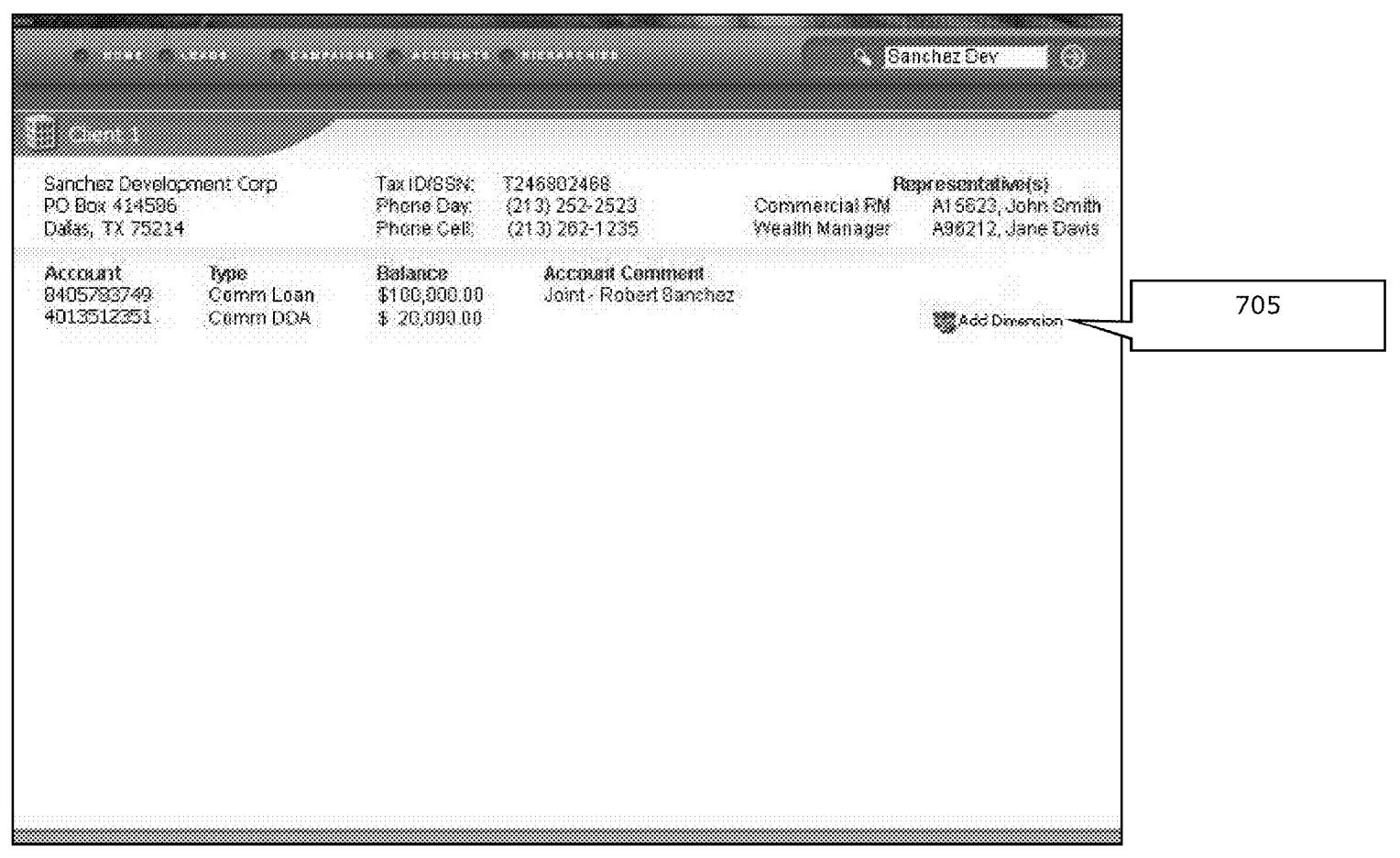
Figure 8:
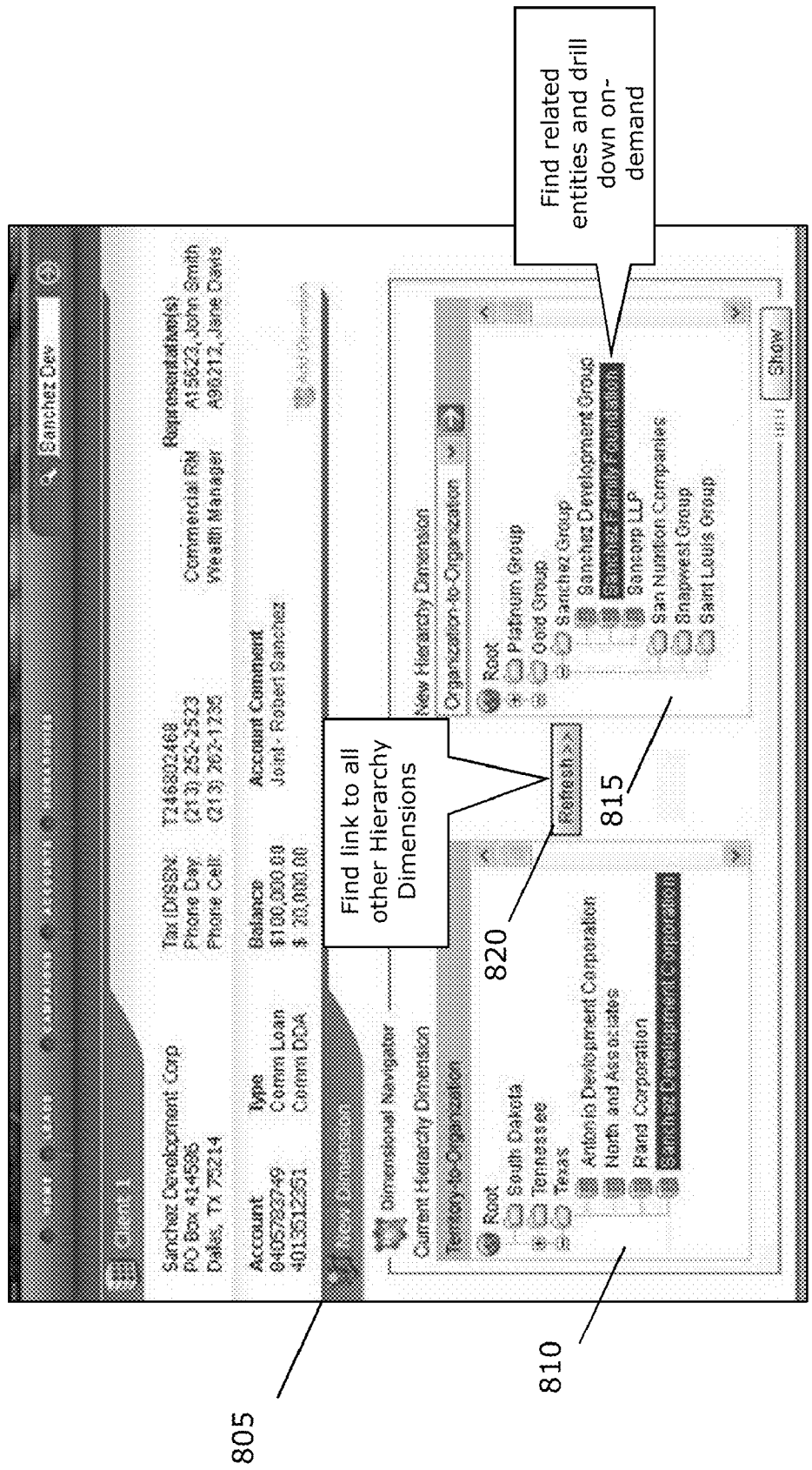
Figure 9:
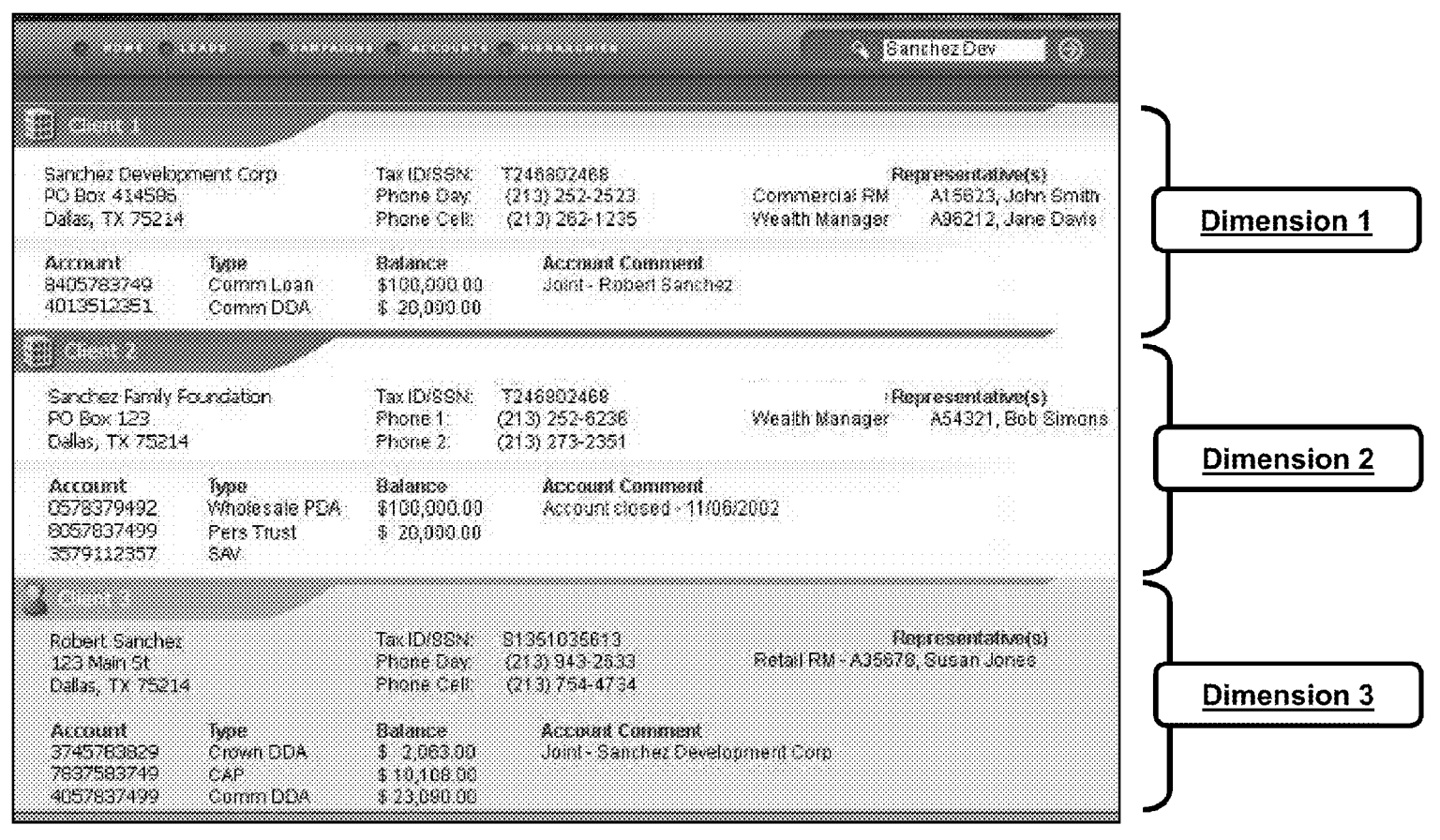

FIGS. 7-9 illustrate another example of cross-hierarchy navigation. In this example, the enterprise is an investment company that wants to evaluate its relationship with a particular client, Sanchez Development Corporation. FIG. 7 illustrates the graphical user interface (GUI) of an enterprise's portal that has used the hierarchy manager 360 to retrieve all the information relating to Sanchez Development's direct business dealings with the investment company. At this stage, Sanchez Development does not look like an extremely important client has it only has two accounts that in the aggregate contain $120,000.

The GUI in FIG. 7 has an "Add Dimension" option 705. FIG. 8 illustrates what the GUI displays when the user selects this option. As shown in this figure, the user's selection of the option 705 causes the hierarchy manager to display a window 805. Through this window, the user can specify other relationship dimensions for the hierarchy manager to search to identify other entities that are associated with the investment company (i.e., the enterprise) and that have a relationship with Sanchez Development.

In the example illustrated in FIG. 8, the window 805 has a first display section 810 that illustrates that Sanchez Development's current information is coming from the Territory-to-Organization data structure (i.e., that the current hierarchy dimension is the Territory-to-Organization dimension). The window 805 also provides a refresh button 820, which when selected (after selecting Sanchez Development in this window) provides in a second display section 815 a list of all other hierarchy dimensions (e.g., all other hierarchy data structures) that contain Sanchez Development.

FIG. 9 illustrates what the GUI displays when the user selects two of the dimensions that the second display section 815 might display. Specifically, after the user selects two dimensions for which Sanchez Development has data, the GUI displays two other clients of the investment company that are related to Sanchez Development in the two selected dimensions. By seeing these two other clients, the investment company will then have a better understanding of all the relationships that it has with Sanchez Development, its affiliates and its related companies and personnel. Without this ability of the hierarchy manager to provide complete view of entities, it would be difficult detecting the fact that these entities are related and the fact that each has multiple dealings with the enterprise.

IV. HIERARCHY MANAGER

Figure 10:
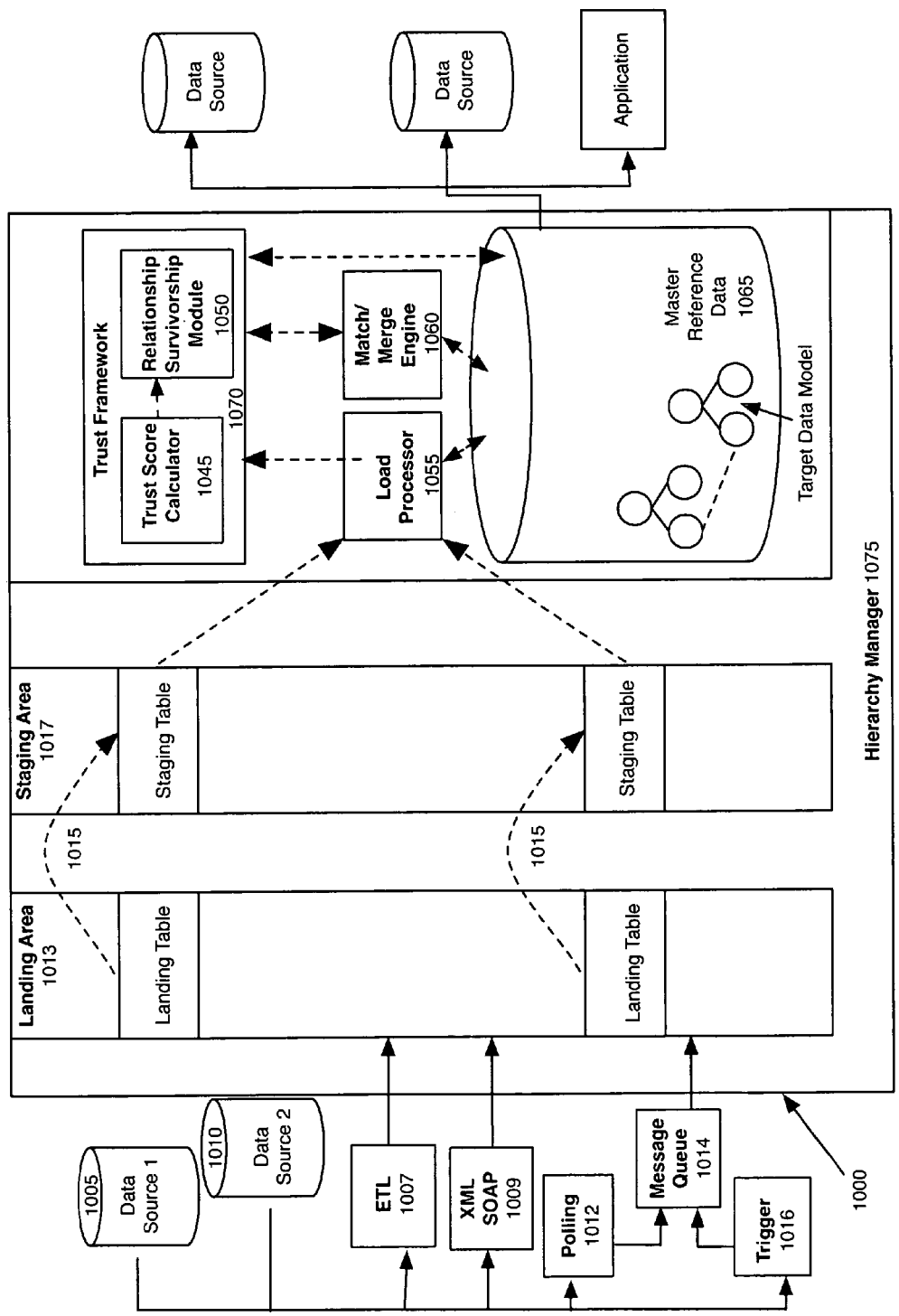
FIG. 10 illustrates a more detailed view of the hierarchy manager of some embodiments of the invention.

FIG. 10 illustrates a more detailed view of the hierarchy manager 1075 of some embodiments of the invention. As shown in this figure, the hierarchy manager includes a landing area 1013, a staging area 1017, a trust framework 1070, a load processor 1055, a match/merge engine 1060, and a master reference data store 1065.

A. Landing Tables

As shown in FIG. 10, the relationship data from a variety of data sources 1005 and 1010 can enter the hierarchy manager 1075 through a variety of pathway processes. For instance, data from a data source 1005 or 1010 (such as a file) can enter the hierarchy manager 1075 (also called relationship manager 1075 below) through an extract-transform-load (ETL) process 1007, which can be a typical batch or scheduled process. Data can also enter the hierarchy manager 1075 through an XML/SOAP process 1009. For instance, an application data source 1005 can generate directly an XML/SOAP process 1009 to deliver data to the hierarchy manager 1075 in real time.

As further shown in FIG. 10, the data sources 1005 and 1010 can also be polled by a polling process 1012 for changes to the data in the data sources 1005 and 1010. For instance, the polling process 1012 may poll a data storage in the data sources 1005 and 1010. The polling process 1012 then generates a message regarding a data change to a message queue 1014, when the polling process 1012 discovers such a change in the data storage. Alternatively, the data storage can directly generate a message regarding a change in data to a trigger process 1016, when such a data change occurs in the data sources 1005 or 1010. The trigger process 1016 may generate a message regarding the change in data to the message queue 1014. The message queue 1014 then delivers the queued messages to the hierarchy manager 1075. In these various embodiments, the messages to and from the message queue 1014 can also use the XML format or another format that permits operation in real time.

Irrespective of whether the ETL process 1007, XML/SOAP process 1009, or the message queue 1014 is used to retrieve data from the data sources 1005 and 1010, data first enters the hierarchy manager 1075 through the landing area 1013, as shown in FIG. 10. At the landing area 1013, the received data is used to construct a landing table. Data in the landing table typically reflects the data structure used by the data sources 1005/1010.

B. Staging Tables and Staging Process

As further shown in FIG. 10, a staging process 1015 constructs in the staging area 1017 staging tables. The staging process 1015 can include delta detection, data cleansing, and standardization. In some embodiments, delta detection initially confirms whether the received data has actually been changed or is different from previously received data. Delta detection may reduce unnecessary processing of unchanged data. In some embodiments, data cleansing and standardization normalize data for processing and storage by the hierarchy manager 1075. In other words, the cleansed data that is stored in the staging table is in a format that can be processed by the trust framework 1070. In some embodiments, this format is the same format that is used to store relationship data in the hierarchy manager 1075.

Figure 11:
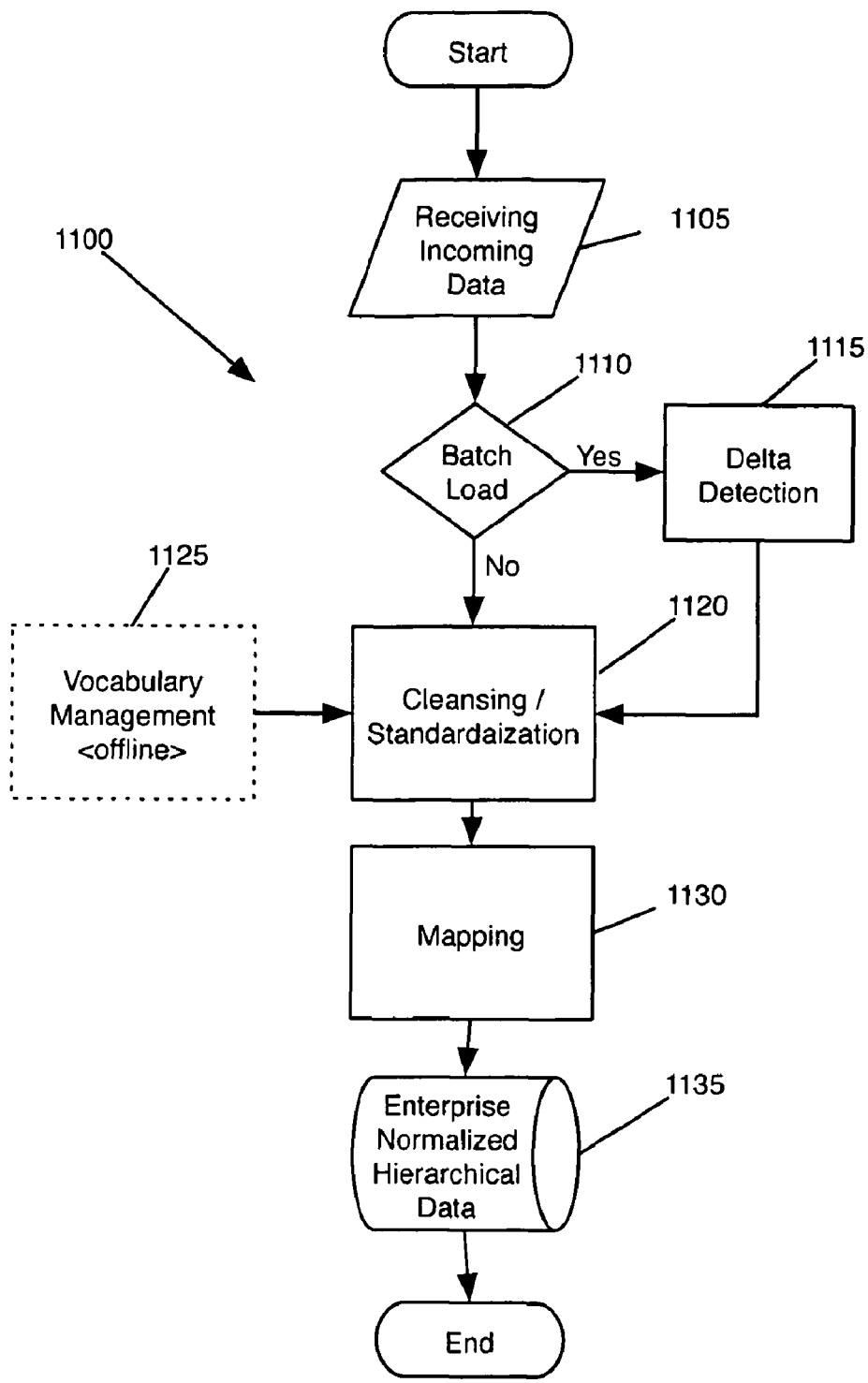
FIG. 11 conceptually illustrates a staging process of some embodiments of the invention.

FIG. 11 conceptually illustrates a staging process 1100 of some embodiments of the invention. The staging process 1100 takes data from the landing area 1012 and processes the data into staging tables in staging area 1017. As illustrated in FIG. 11, the process 1100 initially receives (at 1105) data from a data source. Next, at 1110, the process determines whether the data is being received in a batch load. If so, the process 1100 performs (at 1115) a delta detection operation.

The delta detection operation (at 1115) involves examining each set of relationship data to determine whether the hierarchy manager 1075 previously stored the data set in a master reference store 1065, and if so, whether the data set has changed since it was last received. In some embodiments, this detection is done via timestamp comparison. If an incoming relationship data set has a timestamp identical to that of data set stored in the master reference store, then there is no delta. In other words, if timestamps match, the incoming data set is identical to corresponding existing data set and hence the former is not processed.

The process 1100 performs delta detection only during a bulk load (i.e., only during batch processing) in some embodiments. During a bulk load operation, large amounts of data are processed into the persistent master reference store. In contrast, when a real-time data load occurs, the system of some embodiments assumes that fresh data is coming in and skips delta detection.

After delta detection operation at 1115, the process 1100 transitions to 1120. The process also transitions to 1120 from 1110 when it determines that the data was not received through a batch load operation. At 1120, the process performs data cleansing and standardization operations.

The cleansing operation of some embodiments cleans up and corrects the data in an incoming relationship data set. For instance, to perform date cleansing, the hierarchy manager remove extraneous blanks or other noise characters, change case for an attribute, etc.

Standardization is the process of homogenizing different data codifications. For example, in one application-centric body of data, the male gender may be codified as 'M'. In another application-centric body of data, the male gender may be codified as '1'. During standardization 1120, the system assimilates these two different coding styles into a uniform coding style for the hierarchy manager's data store. In this example, it may be that hierarchy manager standardizes on male codification as 'M', '1', '456', or some other value. The standardization provides a deterministic conversion of the incoming data codification into the uniform codification used by hierarchy manager.

As shown in FIG. 11, the standardization operation 1125 is based on an offline vocabulary management operation 1125. The vocabulary management operation 1125 defines the syntax of the target model, and elaborates on codification standards of the same. During vocabulary management 1125, the target model's vocabulary and codification standards are modifies as necessary. Vocabulary management 1125 also includes definition and verification of target schema in preparation for load.

After the standardization operation at 1120, the process 1100 performs a mapping operation at 1130 to map the standardized data to the enterprise normalized hierarchical data schema in the master reference store 1065. Schema mapping 1130 is the process of projecting incoming data from the source schema onto the target schema. Application-centric data stores have schema, also known as data model, which is most conducive to the specific application that they service. The hierarchy manager data store schema, similarly, will be most suitable for its purpose of managing hierarchical relationship data. Schema mapping 1130 determines the appropriate location in the target schema for each incoming data record. As mentioned above, landing tables in landing area 1012 have schema, or model, that matches their respective input data sources. Staging tables in staging area 1017 have schema, or model, which matches the destination data store 1065 schema.

After the mapping operation at 1130, the received data is in a cleansed, standardized, enterprise-normalized format. The data remains in the staging tables in this format until it is retrieved by or supplied to the load processor 1055.

The process 1100 presented in FIG. 11 conceptually illustrates the hierarchy manager's loading of data into the staging area 1017 under different conditions. One of ordinary skill will realize that some embodiments use different processes to transfer data into the staging area 1017 under different conditions. For instance, some embodiments use one process for performing batch load operations, while using another process for performing real-time load operations. Also, some embodiments perform delta detection operations 1115 for both batch and real-time load operations.

C. Loading Process

Figure 12:
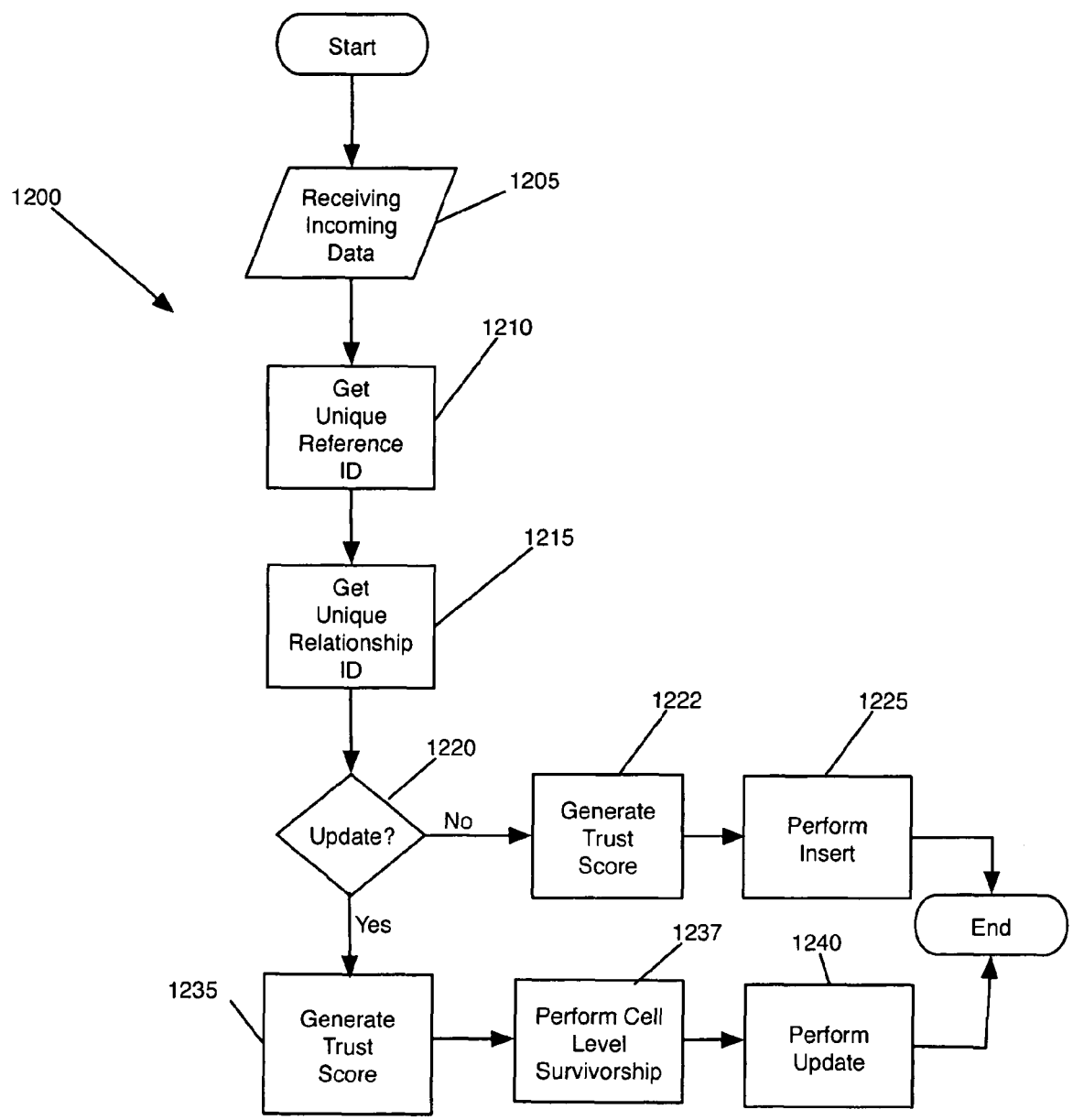
FIG. 12 illustrates a load process of the hierarchy manager of some embodiments of the invention.

After relationship data records are cleansed, standardized, and staged at the staging area 1017, the load processor 1055 of the hierarchy manager 1075 performs a load process 1200 that is illustrated in FIG. 12. The load processor performs this process 1200 for each relationship data set in a staging table that defines a relationship between two entities.

As shown in FIG. 12, the load processor 1055 initially receives (at 1205) a relationship data set in a staging table that defines a relationship between two entities. From the relationship data set, the processor extracts or generates (at 1215) the unique identification code that identifies the relationship between the two entities.

Next, the load processor 1055 uses (at 1220) the unique relationship identification code associated with the received relationship data set to determine whether the data set received at 1205 updates a relationship data set previously stored in the master reference data store 1065. In some embodiments, an update is a modification to a data attribute (e.g., data cell) of a relationship data set (e.g., a relationship data record) that defines the relationship between two entities. Accordingly, at 1220, the load processor 1055 searches the master reference store 1065 to check whether any relationship data set in this storage has the same unique relationship identification code. The presence in the storage of a relationship data set with the unique relationship identification code indicates that the data entering the hierarchy manager 1075 is an update.

When the load processor 1055 determines (at 1220) that the data is not an update (i.e., new data), then the load processor 1055 uses (at 1222) a trust score calculator 1045 of the trust framework 1070 to compute trust scores for each attribute of the received relationship data set. Computation of trust scores are described below. After 1222, the load processor 1055 stores (at 1225) the data in the master reference data store 1065, and then terminates it operation.

On the other hand, when the load processor 1055 determines that the data is an update, then load processor (1) retrieves from the master reference store the previously stored relationship data set that corresponds to the received relationship data set, and (2) has the trust framework 1070 perform (at 1235, 1237, and 1240) the update operation on the retrieved and received relationship data sets.

In some embodiments, the trust framework 1070 applies a concept of "trust" to update relationship records. The concept of trust involves a system of measuring the value and reliability of data. Trust may be represented as a numerical score as to the confidence of the system in that data.

As shown in FIG. 10, the trust framework 1070 includes two modules, a trust score calculator 1045 and a relationship survivorship module 1050. At 1235 of the process 1200, the trust score calculator generates trust scores the trust framework 1070 compute the trust score for the received relationship data set and possibly re-compute the trust score for the previously stored relationship data set in the master reference store. In some embodiments, the trust score calculator 1045 computes trust scores for some or all of the attributes (e.g., fields) in a relationship data set.

This trust score calculator 1045 computes the trust score differently in different embodiments. In some embodiments, the trust score calculator 1045 computes the trust score based on certain parameters, algorithms, and rules. Examples of such parameters are source reliability weighting parameters that specify the reliability of the data source and fields from which the relationship data records are provided. One example of trust rules are syntax validation rules that are used to determine the trust score of a data field based on the value of the data that is stored in that field. For instance, a syntax rule might reduce the trust score of an ownership attribute if the percentage is not between 0 to 100%.

Figure 13:
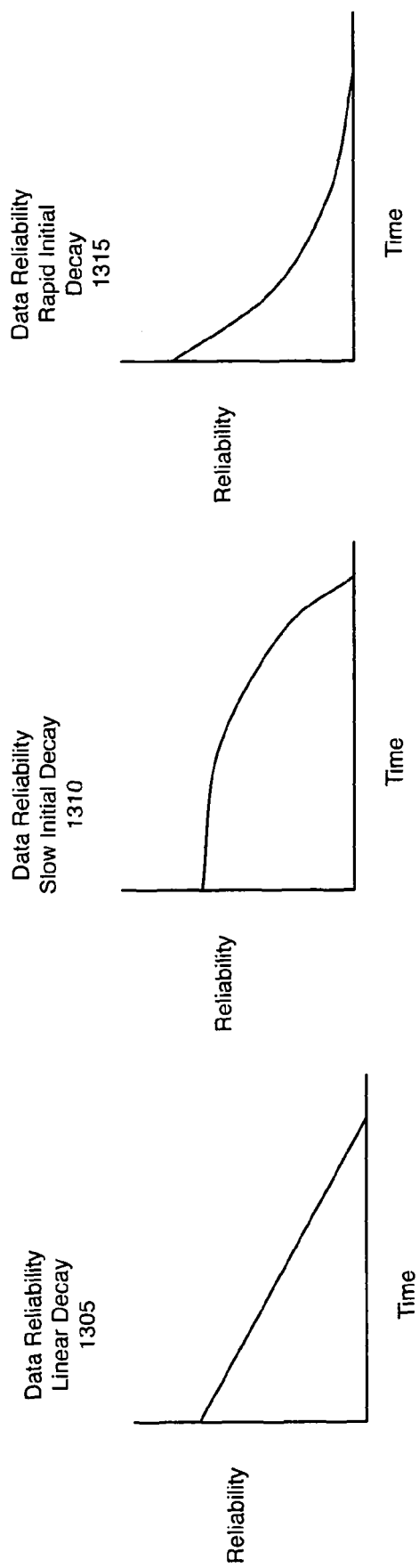
FIG. 13 illustrates three examples of data decay profiles that can be used by data decay algorithms.

Examples of algorithms in the trust framework 1070 include data decay algorithms that express the diminishing value of data over time. FIG. 13 illustrates three examples of data decay profiles that can be used by such data decay algorithms. Such three data decay profiles include: (1) a linear reliability decay function 1305, (2) a slow initial reliability decay function 1310, and (3) a rapid initial reliability decay function 1315. In some embodiments, the trust framework 1070 applies one of these three data reliability decay functions to the data entering the trust framework 1070 to determine the reliability of the data at a point in time. For instance, the rapid initial reliability decay function 1315 can be used to represent data that is expected to change frequently and thus become unreliable within a relatively short passage of time. This data would be expected to have an initial trust score that rapidly diminishes until its reliability (i.e., trust score) plateaus at a lower state. This feature, as represented by the rapid initial reliability decay function 1315, can be attributed to data during scoring. Some embodiments administer data reliability decay functions and applicability to various types of data by using a data steward tool.

Thus, the trust framework 1070 includes a rule-based system of trust that includes various algorithms and parameters. The trust score calculator 1045, in the embodiments described above, applies the system of trust to compute trust scores for data entering trust framework 1070. Trust scoring begins when one or more relationship records are received by the trust framework 1070 from the load processor 1055. In some embodiments, these records are cleansed records received by the load processor 1055 from a staging table. In some embodiments, these records also include stored records retrieved by the load processor 1055 from the master reference data store 1065 based on associated cross-reference keys.

In some embodiments, each attribute of a relationship data set retrieved from the master reference store already has a trust score that was previously calculated. Notwithstanding this previous trust score, the trust score calculator 1045 calculates trust scores for each attribute of the retrieved relationship data set as well as each attribute of the received relationship data set.

Once the trust score calculator 1045 computes (at 1235) one or more trust scores for the relationship data sets, the survivorship module 1050 consolidates (at 1237) the attributes of the relationship data sets (i.e., the received and previously stored relationship data sets) based on the computed trust scores. In some embodiments, the survivorship module 1050 will retain the attributes that have the higher calculated trust score.

The survivorship module 1050 of some embodiments maintains content metadata for each data attribute that it checks for consolidation. Two examples of content metadata are (1) the lineage of the new value and the source that provides this new value, and (2) the history of the replaced value and the source that provided the replaced value. Some embodiments maintain the full lineage and history for the replaced data fields and the data sources from which these fields emanated. Maintaining history and lineage for each field allows some embodiments to provide for an un-merge procedure, as further described below.

After 1237, the load processor stores (at 1240) the scored and/or consolidated relationship data sets in the master reference store 1065. This data then awaits in the master reference store 1065 for additional updating by the hierarchy manger 1075, retrieval by a data consumer, and/or matching by the match/merge engine 1060. The match/merge engine will now be described.

D. Matching and Consolidation

Once relationship data is stored in the hierarchy manager data store 1065, some embodiments further consolidate the stored data through a match and merge process. Such consolidation includes, for instance, removal of redundant relationship records and resolution of conflicting relationship records.

To consolidate relationship records stored in the master reference data store 1065, the hierarchy manager includes the match/merge engine 1060. The match/merge engine 1060 may operate periodically or in real time to consolidate relationship records in the master reference data store 1065. The operation of the match/merge engine 1060 could be triggered by various events such as a change in a relationship data record stored in the master reference data store 1065. The match/merge engine 1060 may also be triggered by a change in the rules and trust algorithms relating to the trust scoring of the relationship records. The data steward may further trigger the match/merge engine 1060 to specifically perform matching at various times.

When scheduled or requested, the match/merge engine 1060 determines whether a relationship data record matches one or more relationship data records stored in the master reference data store 1065. To match existing records in the master reference data store 1065, the match/merge engine 1060 of some embodiments uses a method different from the system of relationship identification keys described above in relation to updating by the load processor 1055.

Figure 14:
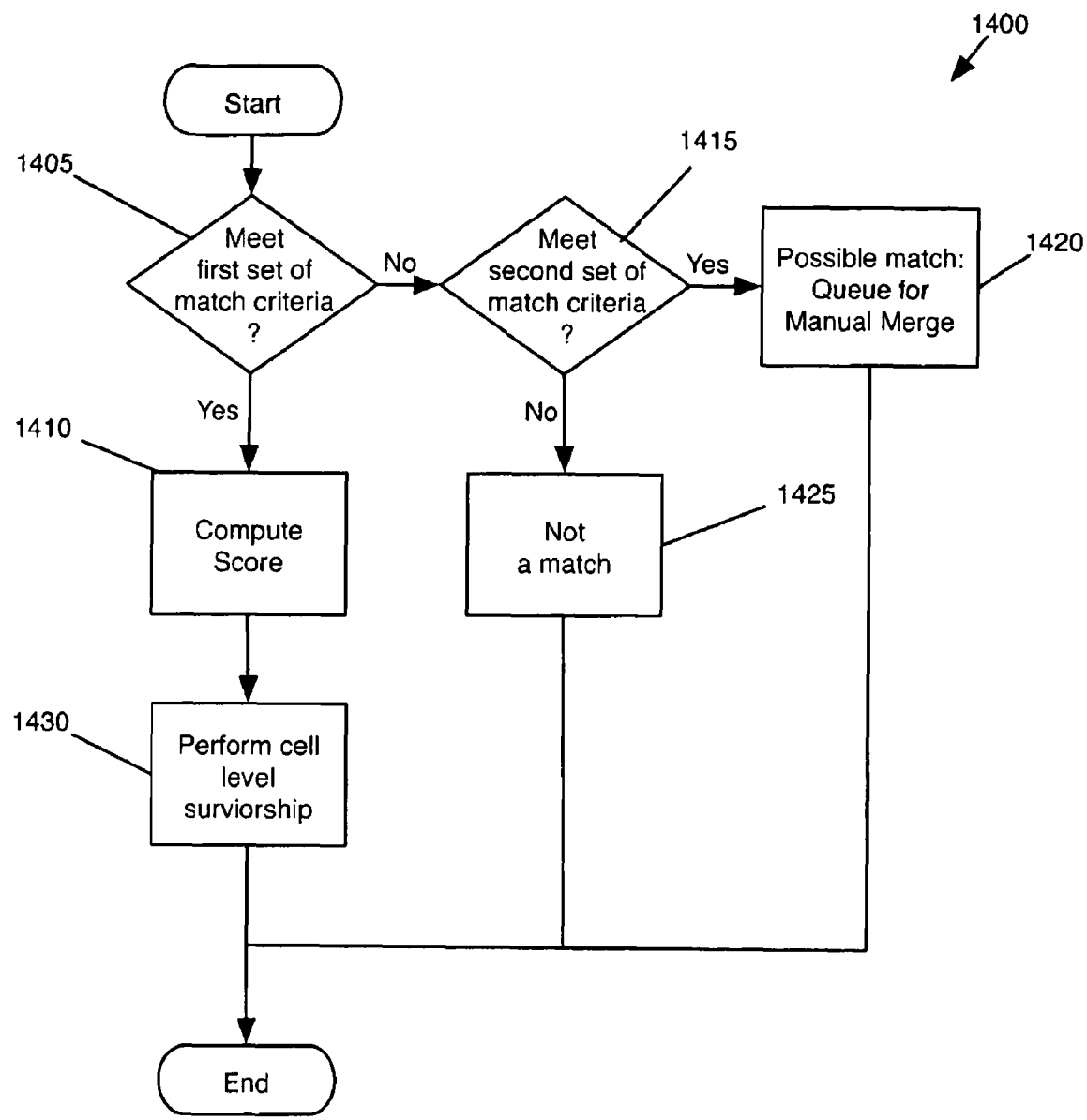
FIG. 14 illustrates a match-and-merge process that is employed by some embodiments.

FIG. 14 illustrates a match-and-merge process 1400 that is employed by some embodiments. The matching engine 1060 performs this process for each potentially matching pair of relationship data sets in the master reference data store 1056. The match process 1400 initially determines (at 1405) whether the two pairs of relationship data sets match on a first set of criteria. In some embodiments, the first set of criteria includes whether a set of X fields match between the records. To perform this determination, the matching engine of some embodiments uses SSA-NAME3 from Identity Systems, an Intellisync Company.

If the process 1400 determines (at step 1405) that the first set of criteria is not met (e.g., the set of X fields do not match), then the match/merge engine 1060 determines (at 1415) whether a second set of criteria are met (e.g., a different set of Z fields match). For this operation, the matching engine of some embodiments can again use the matching modules SSA-NAME3 from Identity Systems, an Intellisync Company.

The second matching determination at 1415 allows the match/merge engine 1060 to differentiate between both the number and the quality of field matches at 1405 and 1415. For instance, in the case where the first set of criteria comprises a set of X field matches, the set of X fields at 1405 might include both a high threshold number of field matches and some particular fields that are a strong indicator of a match (e.g., the direction of the relationship, start date, end date, and role fields all match, or just the start date and end date fields match). This case may represent a correct match between the records for almost every instance where the set of X fields match, and thus meeting this condition indicates a highly probable or "absolute" match.

On the other hand, the second set of criteria for the set of Z fields at 1415 can include a lesser number and a lesser quality of field matches (e.g., only the direction of relationship matches). If only the set of Z fields match, then there is only a possibility of a record match in this instance and this "possible" match should be queued for an individual to inspect the data and/or perform a manual-merge at 1420.

Accordingly, when the process 1400 determines (at 1415) that a manual-merge might be appropriate, then the process 1400 queues up (at 1420) the two relationship data sets for a data steward to review and determine whether the two relationship data sets are a match. On the other hand, when the process determines (at 1415) that the two relationship data sets do not meet the second set of matching criteria (i.e., determines that a manual-merge would not be appropriate), the process specifies (at 1425) that the two relationship data sets are not a match, and then terminates.

When the process 1400 determines (at 1405) that the two relationship data sets meet a first set of matching criteria (i.e., have a sufficient number and/or quality of fields that match), there is a highly probability (i.e., virtually absolute) that the two relationship data sets match. Accordingly, the process directs (at 1410) the trust score calculator to compute trust scores for the attributes of the matching relationship data sets.

In some embodiments, the operation of the trust score calculator 1045 during the matching process 1400 is the same as the operation of this calculator during the update process 1200. Once the trust score calculator 1045 computes (at 1410) one or more trust scores for the relationship data set(s), the survivorship module 1050 consolidates (at 1430) the attributes of the relationship data sets (i.e., the received and previously stored relationship data sets) based on the computed trust scores. In some embodiments, the survivorship module 1050 will retain the attributes that have the higher calculated trust score. During this consolidation, the survivorship module 1050 again maintains content metadata (e.g., lineage and history) for each data attribute that it checks for consolidation. At 1430, the process 1400 stores the consolidate relationship data set and its associated metadata in the master reference store, where it awaits for additional updating by the hierarchy manger 1075, retrieval by a data consumer, and/or matching by a match/merge engine.

A data consumer can retrieve relationship data sets from the master reference store 1065 through a variety of ways. In other words, relationship data sets that are stored in the hierarchy manager can be exported to outside systems such as data warehouses, application-centric data sources, or applications, through a variety of ways, such as ETL tools, XML/SOAP communication, Message Queue, or other suitable method.

E. Un-Merge

The advantage of tracking content metadata (e.g., lineage and history of data) will be further described by reference to an un-merge functionality of some embodiments. At times, a merge procedure will combine reliable relationship data with unreliable relationship data. Unreliable data may contain an error or may simply be misinterpreted data. For instance, a relationship with an entity "John Smith" may be mistakenly interpreted to be the same relationship as with entity "J. Smith". However, it may later be determined that "J. Smith" is actually a separate entity "J. Smith, Jr.". For this instance, some embodiments provide an unmerge procedure that allows the improperly merged relationship for J. Smith Jr., to be extracted from the relationship data for John Smith, and create a separate relationship for J. Smith Jr. At other times, a change in the matching rules will cause previous merges to become obsolete, and require new merges to be performed. For these instances that result in undesired or inappropriate merges, some embodiments provide a sophisticated un-merge procedure.

The un-merge procedure will restore the various cells of a relationship record for John Smith to a state prior to the merge and then re-apply all subsequent merges that did not include the (undesirable) relationship data for J. Smith, Jr. Un-merge differs from a simple "undo" because it does not reverse the change to a single record. Rather, un-merge iterates through the content metadata (e.g., the history and lineage of data) to return a set of records and relationships affected by the un-merge to a state as if the merge with the incorrect and/or unreliable data had never occurred.

Thus, some embodiments provide an un-merge functionality that dramatically improves data reliability and quality. Moreover, some embodiments provide for several additional mechanisms such as updating, and a match and merge process, that promote a unified, consolidated view that is typically the best version of the available data. Further, these embodiments provide these functionalities and processes in real time.

One of ordinary skill will realize that the hierarchy manager 1075 might follow different consolidation policies than those described above. In some embodiments, the policy designates the system as consolidating, where consolidation of data occurs whenever a new value for an existing relationship data set is received. Therefore, these embodiments perform an update operation when they recognize a match between a new and an existing relationship data set. Some embodiments have a policy that designates them as one-off consolidators. In these embodiments, a new value for an existing relationship is always inserted at runtime. Later, the match/merge engine 1060 consolidates and merges these new and old values and updates the data store. Yet other embodiments have a policy of no-consolidation. These embodiments do not consolidate, but always insert new values for existing relationship data.

One of ordinary skill will also recognize that the invention can be embodied in other specific forms without departing from the spirit of the invention, even though the invention has been described with reference to numerous specific details. In view of the foregoing, one of ordinary skill in the art would understand that the invention is not to be limited by the foregoing illustrative details, but rather is to be defined by the appended claims.

We claim:

1. A system for processing relationship data sets that express relationships between various entities associated with an enterprise, the system comprising:
   a master reference manager for (i) receiving a request for data related to a particular entity representing a person or an organization related to the enterprise, and (ii) identifying, based on the request, the particular entity from a master data store that stores master reference data sets representing the most reliable reference data sets maintained in the enterprise for identifying the entities; and
   a hierarchy manager for providing a comprehensive view of a set of relationships that the particular entity has with one or more other person or organization by (i) retrieving, based on the identification of the particular entity by the master reference manager, relationship data sets that express the set of relationships of the particular entity, and (ii) using the retrieved relationship data sets to generate a display of the comprehensive view of the set of relationships in response to the request.

2. The system of claim 1 further comprising an activity manager for processing activity data sets for the entities.

3. The system of claim 2, wherein activity data sets relate to interactions or transactions of the entities with the enterprise.

4. The system of claim 1, wherein the hierarchy manager is further for maintaining a plurality of relationship data sets relating to entities that are not associated with the enterprise but are related to a set of entities that are associated with the enterprise.

5. The system of claim 1, wherein the master data store stores the relationship data sets that express the relationships between the various entities, wherein the hierarchy manager retrieves the relationship data sets that express the set of relationships of the particular entity from the master data store.

6. The system of claim 1, wherein the hierarchy manager provides the comprehensive view of the set of relationships further by receiving relationship data sets relating to the particular entity from a plurality of data stores that are at different physical locations in the enterprise and consolidating the received relationship data sets in the master data store.

7. The system of claim 1, wherein the generated comprehensive view includes relationships that are defined for the particular entity along different relationship dimensions.

8. The system of claim 1, wherein the comprehensive view includes an indirect relationship that the particular entity has with at least one other person or organization.

9. The system of claim 1, wherein the hierarchy manager is further for maintaining the reliability of the relationship data sets by determining whether two previously stored relationship data sets express a same relationship that the particular entity has with one or more other person or organization, and merging the two previously stored relationship data sets when a determination is made that the two previously stored relationship data sets express the same relationship.

10. The system of claim 9, wherein the hierarchy manager is further for identifying the two previously stored relationship data sets to be examined manually when the determination is made that the two previously store relationship data sets partially match one another.

11. The system of claim 10, wherein each of the two previously stored relationship data sets comprises a set of fields, wherein the determination is made that the two previously stored relationship data sets partially matches one another based on a set of criteria that identifies a number of fields of the two previously stored relationship data sets that match.

12. The system of claim 1, wherein the hierarchy manager is further for storing a set of start and end dates for the relationship data sets in order to track changes in the set of relationships that the particular entity has with one or more other person or organization.

13. A method for processing relationship data sets that express relationships between various entities associated with an enterprise, the method comprising:
   receiving a request for data related to a particular entity representing a person or an organization related to the enterprise;
   based on the request, identifying the particular entity from a master data store that stores master reference data sets representing the most reliable reference data sets maintained in the enterprise for identifying the entities;
   retrieving, based on the identification of the particular entity, relationship data sets that express a set of relationships that the particular entity has with one or more other person or organization; and
   using the retrieved relationship data sets to generate a display of a comprehensive view of the set of relationships.

14. The method of claim 13 further comprising processing activity data sets for the particular entity.

15. The method of claim 14, wherein the activity data sets relate to interactions or transactions of the particular entity with the enterprise.

16. The method of claim 13, wherein the relationship data sets express a relationship that the particular entity has with at least one person or organization that is not associated with the enterprise but is related to a person or organization that is associated with the particular entity.

17. The method of claim 13 further comprising:
receiving relationship data sets relating to the particular entity from a plurality of data stores that are at different physical locations in the enterprise; and
consolidating the received relationship data sets in a master data store.

18. The method of claim 17 further comprising calculating at least one particular trust score for each of the relationship data sets from the plurality of data stores, wherein the particular trust score indicates the reliability of the corresponding relationship data set.

19. The method of claim 13, wherein the generated view includes relationships that are defined for the particular entity along different relationship dimensions.

20. The method of claim 13, wherein the generated view includes an indirect relationship that the particular entity has with another person or organization.

21. The method of claim 13 further comprising:
receiving a relationship data set relating to the particular entity;
calculating a trust score that indicates the reliability of the received relationship data set; and
storing the received relationship data set based on a comparison of the calculated trust score against another trust score for a previously stored relationship data set.

22. The method of claim 21, wherein the storing comprises updating the previously stored relationship data set with the received relationship data set when the comparison of the trust scores indicates that the received relationship data set is more reliable than the previously stored relationship data set.

23. The method of claim 13 further comprising:
receiving a relationship data set relating to the particular entity;
updating a previously stored relationship data set with the received relationship data set; and
maintaining a set of one or more data values of the previously stored relationship data set as historical content metadata in order to restore the updated relationship data set to the previously stored relationship data set when a determination is made that the update affected reliability of the relationship data set relating to the particular entity.

* * * * *